United States Patent
Yamasaki et al.

(10) Patent No.: US 9,793,990 B2
(45) Date of Patent: Oct. 17, 2017

(54) WORKER MANAGEMENT DEVICE, WORKER MANAGEMENT SYSTEM, AND WORKWEAR

(71) Applicant: PANASONIC INTELLECTUAL PROPERTY MANAGEMENT CO., LTD., Osaka (JP)

(72) Inventors: Shigeaki Yamasaki, Osaka (JP); Yoshihiko Matsukawa, Nara (JP); Masaaki Ikehara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 14/734,334

(22) Filed: Jun. 9, 2015

(65) Prior Publication Data
US 2015/0365173 A1    Dec. 17, 2015

(30) Foreign Application Priority Data

Jun. 12, 2014 (JP) .................................. 2014-121889
Feb. 27, 2015 (JP) .................................. 2015-039558

(51) Int. Cl.
| H04B 10/00 | (2013.01) |
| H04B 10/116 | (2013.01) |
| H04B 10/114 | (2013.01) |
| G06K 19/06 | (2006.01) |
| H04J 14/00 | (2006.01) |
| G08B 3/10 | (2006.01) |

(52) U.S. Cl.
CPC ..... *H04B 10/116* (2013.01); *G06K 19/06009* (2013.01); *H04B 10/1149* (2013.01); *G08B 3/10* (2013.01)

(58) Field of Classification Search
CPC .............. H04B 10/114; H04B 10/1141; H04B 10/1143; H04B 10/116
See application file for complete search history.

(56) References Cited

U.S. PATENT DOCUMENTS

2014/0341588 A1* 11/2014 Pederson ............... H04B 10/40
398/128

FOREIGN PATENT DOCUMENTS

JP    2011-034458    2/2011

* cited by examiner

*Primary Examiner* — Daniel Dobson
(74) *Attorney, Agent, or Firm* — Greenblum & Bernstein, P.L.C.

(57) ABSTRACT

A worker management device that manages a worker wearing workwear includes: a main body; a light receiver that is provided on a part of the main body that is exposed when the main body is attached to the workwear, and receives light including predetermined identification information; a controller connected to the light receiver; and a communication unit connected to the controller.

20 Claims, 28 Drawing Sheets

FIG. 7A

| LOG IDENTIFIER | TIME INFORMATION | DEVICE IDENTIFICATION INFORMATION (TAG ID) | LIGHT SOURCE IDENTIFICATION INFORMATION (VISIBLE LIGHT ID) | ACCOMPANYING INFORMATION |
|---|---|---|---|---|
| log00001 | 2014/06/09 09:21 | tag001 | light0024 | — |
| log00002 | 2014/06/09 09:40 | tag005 | light0036 | door06 Open |
| log00003 | 2014/06/09 09:45 | tag005 | light0026 | — |
| log00004 | 2014/06/09 09:46 | tag005 | light0027 | — |
| ... | ... | ... | ... | ... |

FIG. 7B

| USER INFORMATION | DEVICE IDENTIFICATION INFORMATION (TAG ID) |
|---|---|
| user A | tag001 |
| user B | tag002 |
| user C | tag005 |
| user D | tag024 |
| ⋮ | ⋮ |

FIG. 17

|    | TIME     | VISIBLE LIGHT ID |
|----|----------|------------------|
| t0 | 13:10:00 | light0023        |
| t1 | 13:20:00 | light0024        |
| t2 | 13:30:00 | light0025        |
| t3 | 13:40:00 | light0030        |
| t4 | 13:50:00 | light0035        |
| t5 | 14:00:00 | light0034        |
| t6 | 14:10:00 | light0033        |

| VISIBLE LIGHT ID | CAMERA NUMBER |
|---|---|
| light0021 | CA0490 |
| light0022 | CA0490 |
| light0023 | CA0490 |
| light0024 | CA0490 |
| light0025 | CA0490 |
| light0026 | CA0491 |
| light0027 | CA0491 |
| light0028 | CA0491 |
| light0029 | CA0491 |
| light0030 | CA0491 |
| light0031 | CA0492 |
| light0032 | CA0492 |
| light0033 | CA0492 |
| light0034 | CA0492 |
| light0035 | CA0492 |
| light0036 | CA0493 |
| light0037 | CA0494 |

WORKER MANAGEMENT DEVICE, WORKER MANAGEMENT SYSTEM, AND WORKWEAR

CROSS REFERENCE TO RELATED APPLICATIONS

The present application is based on and claims priority of Japanese Patent Applications No. 2014-121889 filed on Jun. 12, 2014, and No. 2015-039558 filed on Feb. 27, 2015. The entire disclosure of the above-identified applications, including the specifications, drawings and claims is incorporated herein by reference in its entirety.

BACKGROUND OF THE INVENTION

1. Field of the Invention

The present disclosure relates to a worker management device, a worker management system, and workwear for managing workers.

2. Description of the Related Art

Conventionally, cameras are installed, for example, in food factories or pharmaceutical factories, in order to monitor actions of workers. For example, in a monitoring system disclosed in Japanese Unexamined Patent Application Publication No. 2011-034458, actions of workers are monitored based on images of the workers captured by cameras.

SUMMARY OF THE INVENTION

However, a problem with the above-described conventional monitoring system is that actions of workers cannot be managed on a per worker basis.

For example, almost all workers wear the same or similar workwear in food factories or pharmaceutical factories. Furthermore, the workers wear caps, masks, and the like in response to a demand for thorough hygienic management. Thus, all the workers not only dress the same or alike but also have their face or hairstyle covered and not visible; therefore, even when the workers are captured by cameras, it is difficult to identify an individual worker from the captured images.

Thus, an object of the present disclosure is to provide a worker management device, a worker management system, and workwear that enable proper management on actions of workers on a per worker basis.

In order to achieve the aforementioned object, according to one aspect of the present disclosure, a worker management device for managing a worker wearing workwear includes: a main body; a light receiver that is provided on a part of the main body and receives light including identification information which is predetermined, the part of the main body being exposed when the main body is attached to the workwear; a first controller connected to the light receiver; and a first communication unit connected to the first controller.

Furthermore, a worker management system according to one aspect of the present disclosure includes: the above-described worker management device; a light source that outputs the light including the identification information; and a control device that communicates with the worker management device, wherein the control device includes: a second communication unit configured to communicate with the first communication unit; and a second controller connected to the second communication unit.

Furthermore, workwear according to one aspect of the present disclosure includes: a pocket that receives the worker management device; a light-transmitting window provided at a front face of the pocket; and a light-transmitting cover provided on the light-transmitting window.

Accordingly, actions of workers can be properly managed on a per worker basis.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7A illustrates one example of worker log information according to an embodiment of the present disclosure;

FIG. 7B illustrates one example of a worker database according to an embodiment of the present disclosure;

FIG. 17 illustrates log information on a specific worker according to an embodiment of the present disclosure;

FIG. 18 illustrates an association table associating visible light IDs and camera numbers according to an embodiment of the present disclosure;

DETAILED DESCRIPTION OF THE PREFERRED EMBODIMENTS

Hereinafter, a worker management device, a worker management system, and workwear according to each embodiment of the present disclosure are described in detail with reference to the accompanying drawings. Note that each embodiment described below shows a specific preferred example of the present disclosure. Therefore, the numerical values, shapes, materials, structural elements, arrangement and connection of the structural elements, etc., shown in the following embodiments are mere examples, and are not intended to limit the present disclosure. Consequently, among the structural elements in the following embodiments, elements not recited in any one of the independent claims which indicate the broadest concepts of the present disclosure are described as arbitrary structural elements.

Note that the respective figures are schematic diagrams and are not necessarily precise illustrations. Additionally, like structural elements in the figures share the same reference numbers.

First Embodiment

The following describes a worker management system according to a first embodiment, and a worker management device and workwear that are used in the worker management system. First, a factory preferred to use the worker management system is described.

1. Factory

Figure 1:
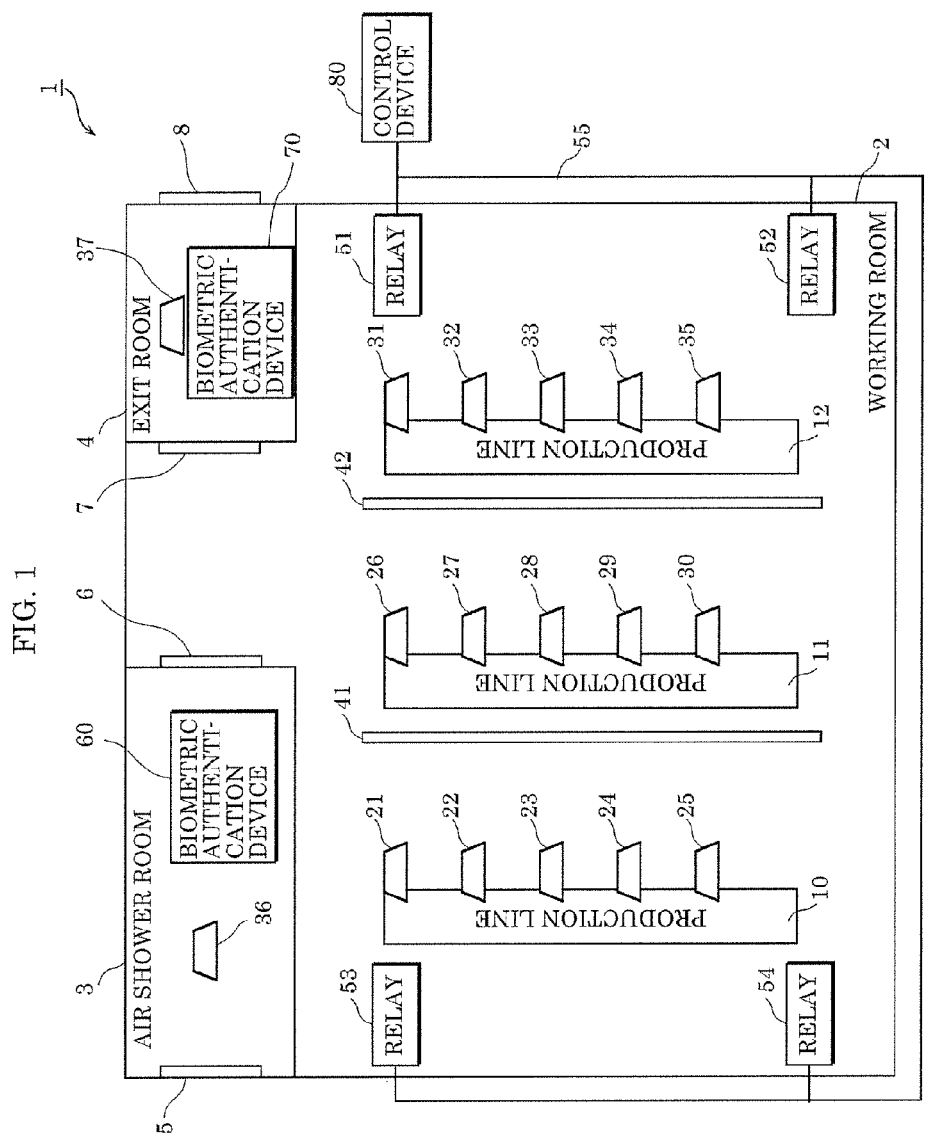
FIG. 1 is a schematic plan view of a factory that uses a worker management system according to an embodiment of the present disclosure.

First, a factory that uses a worker management system according to the present embodiment is described with reference to FIG. 1. FIG. 1 is a schematic plan view of a factory that uses worker management system 1 according to the present embodiment.

The factory illustrated in FIG. 1 is among various factories such as food factories, pharmaceutical factories, and semiconductor manufacturing plants. The factory is sectioned into rooms, for example. Specifically, the factory is sectioned including working room 2, air shower room 3, and exit room 4.

Working room 2 is where workers do predetermined tasks. Air shower room 3 is where workers pass when entering working room 2. Exit room 4 is where workers pass when exiting working room 2.

Doors 5 to 8 for workers to enter and exit the rooms are provided between the rooms and between each of the rooms and outside of the factory. Specifically, door 5 is provided between air shower room 3 and outside of the factory. Door 6 is provided between air shower room 3 and working room 2. Door 7 is provided between working room 2 and exit room 4. Door 8 is provided between exit room 4 and outside of the factory. This means that workers pass through door 5, air shower room 3, and door 6 in sequence to enter working room 2, and pass through door 7, exit room 4, and door 8 in sequence to exit working room 2.

Note that doors 5 to 8 are connected to control device 80 via a predetermined network such as a local area network (LAN). Unlocking and locking of doors 5 to 8 are controlled by control device 80, for example. Specific operations are described later.

1-1. Working Room

Production lines 10 to 12 are installed in working room 2. One or more workers are lined up beside each of production lines 10 to 12 and do predetermined tasks. For example, five work stations are provided on each of production lines 10 to 12. Furthermore, a lighting device is provided on each of the work stations.

Specifically, five lighting devices 21 to 25 are installed on the respective five work stations on production line 10. Five lighting devices 26 to 30 are installed on the respective five work stations on production line 11. Five lighting devices 31 to 35 are installed on the respective five work stations on production line 12.

These 15 lighting devices 21 to 35 are each one example of a light source that outputs light including predetermined identification information. Specifically, lighting devices 21 to 35 each output visible light (illuminating light). Note that visible light is light of a wavelength ranging from 380 nm to 780 nm, for example.

Lighting devices 21 to 35 are each assigned a unique ID, and output visible light superimposed with light source identification information indicating the unique ID. The unique ID is an identification number for identifying the lighting device assigned therewith from other lighting devices, and is, for example, a serial number such as a manufacturing number.

Note that, for example, lighting devices 21 to 25 on production line 10 each illuminate a predetermined illumination area with visible light. This forms, at each work station, an illumination area (which may be hereinafter referred to as "light-receiving space") that is illuminated with illuminating light (visible light) from one corresponding lighting device. The illumination areas preferably do not overlap each other, but may partially overlap each other.

Furthermore, partitions 41 and 42 are provided between production lines 10 to 12 in working room 2. Specifically, partition 41 is provided between production line 10 and production line 11, and partition 42 is provided between production line 11 and production line 12.

Partitions 41 and 42 extend, for example, from the floor to the ceiling of working room 2. With this, for example, light emitted from lighting devices 26 to 30 installed on production line 11 can be prevented from reaching other production lines 10 and 12. In other words, partitions 41 and 42 can reduce overlap between illumination areas of lighting devices.

Furthermore, four wireless relays 51 to 54 are installed in working room 2. Note that the number of wireless relays is not limited to the number indicated above, and may be one. Wireless relays 51 to 54 are each a router that performs communication based on a predetermined wireless communication standard, for example. The wireless communication standard includes, for example, Wi-Fi (registered trademark), Bluetooth (registered trademark), or ZigBee (registered trademark) (IEEE802.15.4).

Wireless relays 51 to 54 are connected to control device 80 via a predetermined network such as a LAN, for example. Specifically, wireless relays 51 to 54 are connected to control device 80 by transmission cable 55 for wired communication (such as a LAN cable, for example).

Wireless relays 51 to 54 relay communication between control device 80 and the worker management device attached to workwear worn by a worker. For example, wireless relays 51 to 54 perform wireless communication with the worker management device. Wireless relays 51 to 54 receive predetermined information from the worker management device and transmit the received information to control device 80, for example. A specific structure of the worker management device and a specific example of information received and transmitted via wireless communication are described later.

1-2. Air Shower Room

A blower (not illustrated in the drawings) and the like are installed in air shower room 3. Fresh air from the blower removes dust, foreign objects, or the like from workwear so that a surface of the workwear is cleared and cleaned up. Therefore, as a result of a worker passing through air shower room 3 before entering working room 2, hygiene of the worker can be kept.

As illustrated in FIG. 1, biometric authentication device 60 and lighting device 36 are installed in air shower room 3.

Biometric authentication device 60 performs biometric authentication of the worker who entered air shower room 3. The biometric authentication is at least one of fingerprint authentication, iris authentication, voiceprint authentication, and face authentication. Biometric authentication device 60 is connected to control device 80 via a predetermined network such as a LAN. Biometric authentication device 60 transmits the result of the biometric authentication to control device 80.

Note that a biometric authentication database is stored in biometric authentication device 60. The biometric authentication database is, for example, a database in which personal information, such as name and age of workers, and biological data required for the biometric authentication are associated. The biological data is, for example, fingerprint data, iris data, voiceprint data, and face data (three-dimensional coordinate data on characteristic sites such as eyes).

Lighting device 36 is, for example, the same as lighting devices 21 to 35 installed in working room 2. A unique ID of lighting device 36 is different from those of other lighting devices 21 to 35.

1-3. Exit Room

As illustrated in FIG. 1, biometric authentication device 70 and lighting device 37 are installed in exit room 4.

Biometric authentication device 70 performs biometric authentication of the worker who entered exit room 4. Biometric authentication device 70 is connected to control device 80 via a predetermined network such as a LAN. Biometric authentication device 70 transmits the result of the biometric authentication to control device 80.

Note that a biometric authentication database is stored in biometric authentication device 70. The biometric authentication database stored in biometric authentication device 70 is, for example, the same as the biometric authentication database stored in biometric authentication device 60. Biometric authentication devices 60 and 70 may share a biometric authentication database. For example, the shared biometric authentication database is stored in control device 80 and a cloud server.

Lighting device 37 is, for example, the same as lighting devices 21 to 35 installed in working room 2. A unique ID of lighting device 37 is different from those of other lighting devices 21 to 35.

2. Workwear and Worker Management Device

A worker and a worker management device in worker management system 1 according to the present embodiment are described below.

Figure 2A:
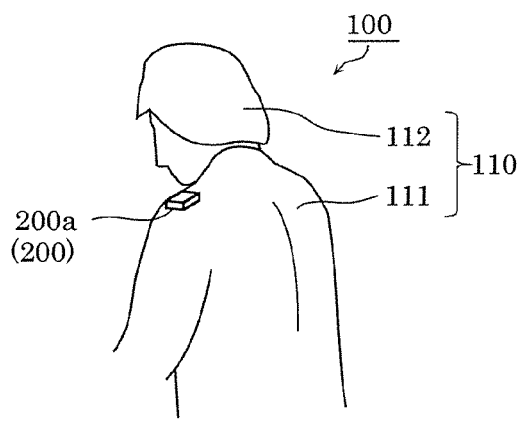
FIG. 2A is a perspective view illustrating an example in which a worker management device is attached to workwear according to an embodiment of the present disclosure.
Figure 2B:
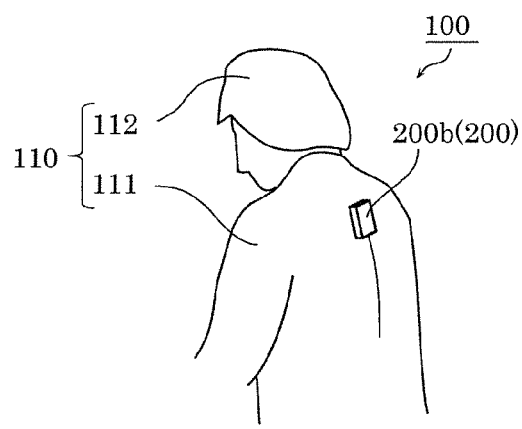
FIG. 2B is a perspective view illustrating another example in which a worker management device is attached to workwear according to an embodiment of the present disclosure.
Figure 2C:
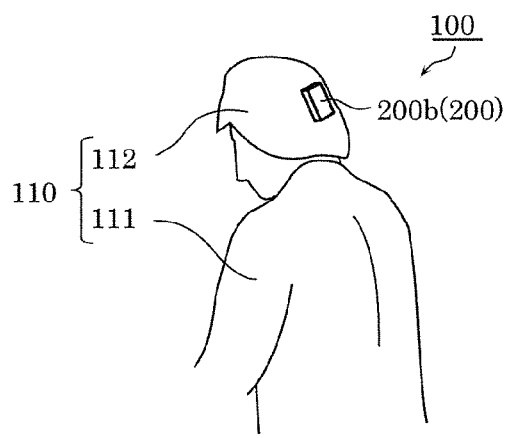
FIG. 2C is a perspective view illustrating another example in which a worker management device is attached to workwear according to an embodiment of the present disclosure.

FIG. 2A to FIG. 2C are each a perspective view illustrating an example in which worker management device 200 is attached to workwear 110 according to the present embodiment. Specifically, FIG. 2A to FIG. 2C each illustrate workwear 110 worn by worker 100 as having attached thereto worker management device 200.

2-1. Workwear

Worker 100 is a person to be managed by worker management system 1. Worker 100 enters the factory illustrated in FIG. 1 and does a predetermined task. For example, worker 100 is an employee who works in a factory.

Worker 100 wears workwear 110. In other words, workwear 110 is clothing worn by worker 100. For example, workwear 110 is clothing for protecting worker 100 or keeping hygiene of worker 100 during work. Workwear 110 is made of a fibrous material, for example.

As illustrated in FIG. 2A to FIG. 2C, workwear 110 includes jacket 111 and cap 112.

Jacket 111 is clothing for protecting the upper body of worker 100. Note that jacket 111 may be a coverall, which is a one-piece suit with upper body clothing and lower body clothing connected.

Cap 112 is clothing for protecting the head of worker 100. Cap 112 reduces the occurrence of hair of worker 100 falling off.

Jacket 111 and cap 112 may be in one piece. Furthermore, workwear 110 may include a mask (not illustrated in the drawings). The mask is clothing for protecting the nose and the mouth of worker 100.

2-2. Worker Management Device

Figure 3A:
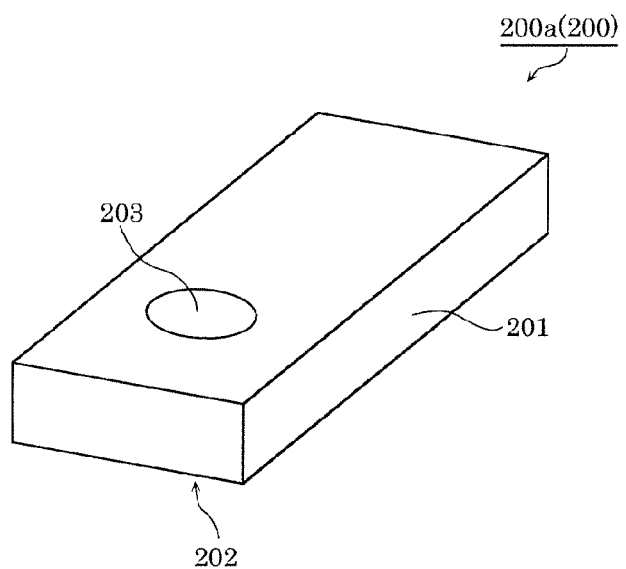
FIG. 3A is a perspective view illustrating one example of an outer appearance of a worker management device according to an embodiment of the present disclosure.
Figure 3B:
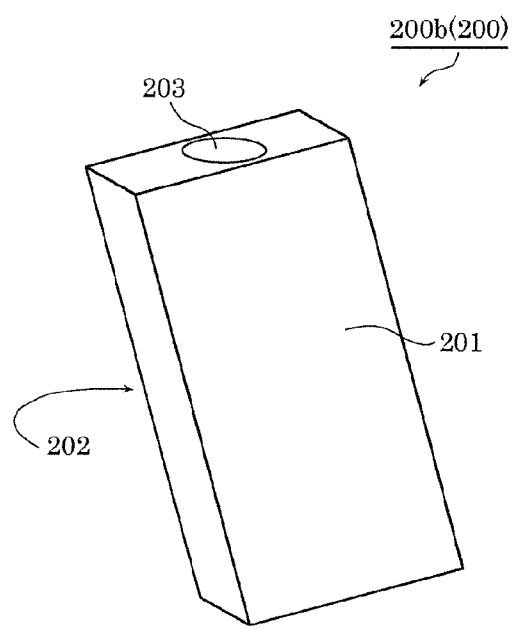
FIG. 3B is a perspective view illustrating another example of an outer appearance of a worker management device according to an embodiment of the present disclosure.

FIG. 3A and FIG. 3B are each a perspective view illustrating an outer appearance of worker management device 200 according to the present embodiment.

Worker management device 200 is a terminal for managing worker 100 who wears workwear 110. As illustrated in FIG. 3A and FIG. 3B, worker management device 200 includes main body 201, attachment element 202, and light receiver 203.

Main body 201 is a housing in the form of a substantial rectangular parallelepiped, for example. Main body 201 incorporates a communication module (communication unit 240 in FIG. 5), a microcomputer (controller 220 in FIG. 5), and a battery (power supply 250 in FIG. 5), for example. Main body 201 is, for example, made of a resin material such as plastic. Note that the above-stated form of main body 201 is one example; main body 201 may be in any form.

Attachment element 202 is a member provided on a part of main body 201, for attaching main body 201 to workwear 110. For example, attachment element 202 is a hook-and-loop fastener provided on one surface of main body 201. Attachment element 202 is provided on a bottom portion of main body 201, for example.

Light receiver 203 is provided on a part of main body 201 that is exposed when main body 201 is attached to workwear 110. For example, light receiver 203 is provided on a top portion of main body 201 as illustrated in FIG. 3A. Alternatively, light receiver 203 may be provided on a side portion of main body 201 as illustrated in FIG. 3B. The surface of main body 201 on which attachment element 202 is provided is herein called the bottom. In sum, light receiver 203 is provided on a surface (the top surface) opposite a surface (the bottom surface) on which attachment element 202 is provided, or on a surface (the side surface) intersecting the bottom surface.

Light receiver 203 receives light including predetermined identification information. Specifically, light receiver 203 receives visible light outputted from lighting device 21 or the like. Light receiver 203 is connected to controller 220.

2-3. Attachment Example

Figure 4:
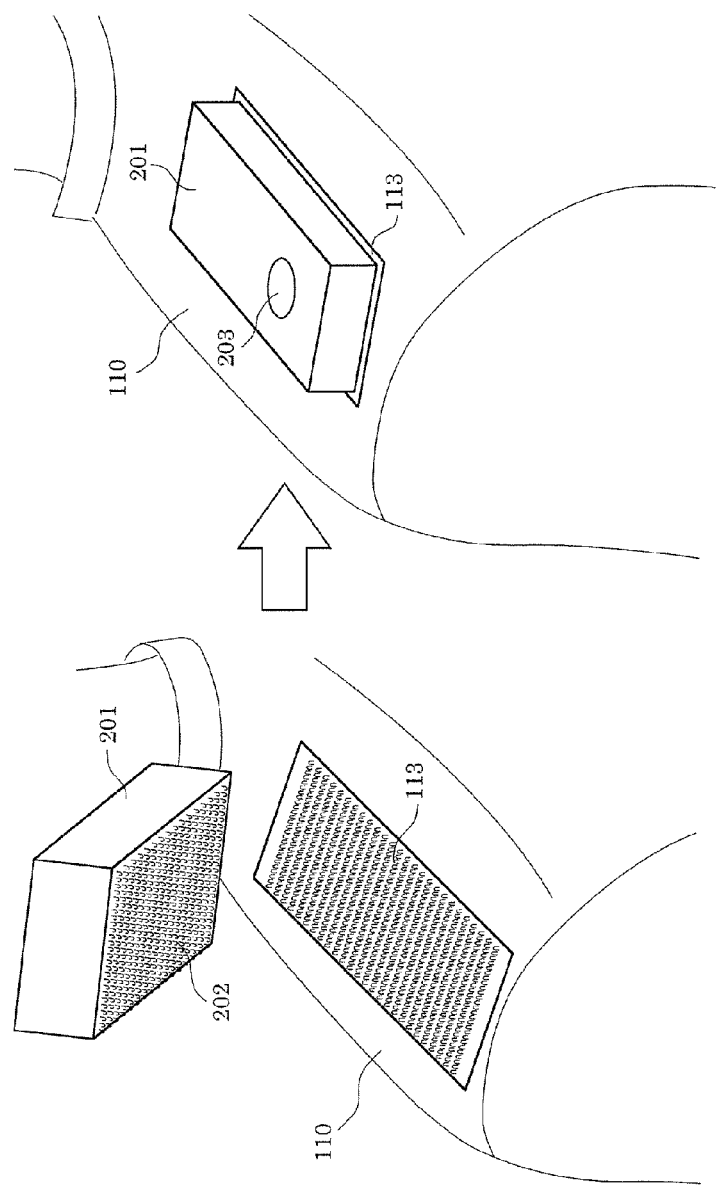
FIG. 4 illustrates how a worker management device is attached to workwear according to an embodiment of the present disclosure.

FIG. 4 illustrates how worker management device 200 is attached to workwear 110 according to the present embodiment.

As illustrated in FIG. 4, attachment element 202 is detachably attached to companion attachment element 113. Companion attachment element 113 is fixed to a part of workwear 110. For example, attachment element 202 has a hook side of a hook-and-loop fastener, and companion attachment element 113 has a loop side of the hook-and-loop fastener. It may be that attachment element 202 has the loop side and companion attachment element 113 has the hook side.

With this, it is possible to easily attach and detach worker management device 200 from workwear 110. Furthermore, the use of the hook-and-loop fastener allows at least one of the orientation and the position of worker management device 200 to be adjusted upon attachment of worker management device 200. Therefore, for example, with main body 201 attached to companion attachment element 113 in such a way that light receiver 203 faces the lighting device, light can be more efficiently received.

Typically, lighting devices 21 to 37 and the like are provided on the ceiling of the factory and output light in such a way that the floor is illuminated with the light from the ceiling. This means that when worker 100 stands upright, light comes from above the head.

Meanwhile, worker 100 often faces down or leans forward during work. Therefore, worker management device 200 is attached to the back side of worker 100 rather than to the front side of worker 100 so that light can be more efficiently received. For example, worker management device 200 is attached to an upper shoulder surface or an upper back part of jacket 111 of workwear 110 or cap 112.

At this time, when the upper shoulder surface of workwear 110 is chosen as illustrated in FIG. 2A, worker management device 200a with light receiver 203 on the top as illustrated in FIG. 3A is attached. With this, light from above worker 100 can be efficiently received.

When a back part of workwear 110 is chosen as illustrated in FIG. 2B, worker management device 200b with light receiver 203 on the side as illustrated in FIG. 3B is attached. At this time, worker management device 200b is attached in such a way that light receiver 203 is on the head side. With this, light from above worker 100 can be efficiently received.

When cap 112 of workwear 110 is chosen as illustrated in FIG. 2C, worker management device 200b such as that illustrated in FIG. 3B is attached. With this, light from above worker 100 can be efficiently received.

2-4. Functional Structure

Figure 5:
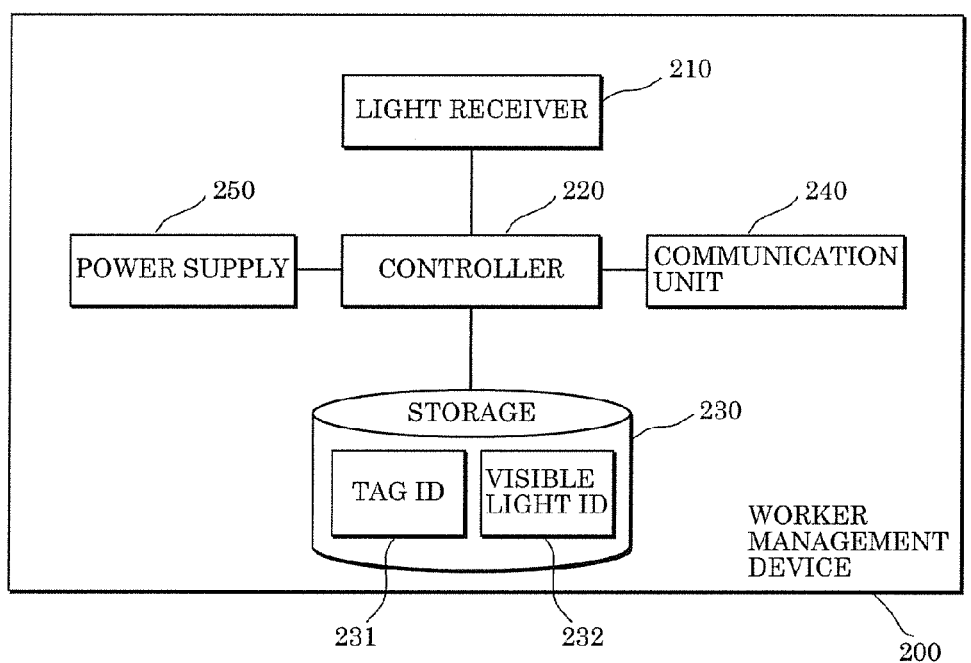
FIG. 5 is a block diagram illustrating a structure of a worker management device according to an embodiment of the present disclosure.

Next, a functional structure of worker management device 200 according to the present embodiment is described with reference to FIG. 5. FIG. 5 is a block diagram illustrating a functional structure of worker management device 200 according to the present embodiment.

As illustrated in FIG. 5, worker management device 200 includes light receiver 210, controller 220, storage 230, communication unit 240, and power supply 250.

Light receiver 210 is equivalent to light receiver 203 illustrated in FIG. 3A and FIG. 3B. Light receiver 210 is, for example, a light-receiving device such as a photodiode or a phototransistor. Light receiver 210 receives light (visible light) from lighting devices 21 to 37. Light receiver 210 generates an electrical signal by performing photoelectric conversion on the received light, and outputs the generated electrical signal to controller 220.

Controller 220 is one example of a first controller connected to light receiver 210. Controller 220 is, for example, a microprocessor or a microcontroller (a microcomputer).

Controller 220 extracts light source identification information from the light received by light receiver 210. Specifically, every time light receiver 210 receives light, controller 220 extracts the light source identification information from the electrical signal generated by the photoelectric conversion. Controller 220 determines whether or not the extracted light source identification information matches visible light ID 232 stored in storage 230.

When the extracted light source identification information matches visible light ID 232, controller 220 discards the extracted light source identification information. When the extracted light source identification information does not match visible light ID 232, controller 220 causes storage 230 to store the extracted light source identification information as visible light ID 232, as well as outputs the extracted light source identification information to communication unit 240. Thus, the latest light source identification information is always stored in storage 230.

Tag ID 231 and visible light ID 232 are stored in storage 230. Storage 230 is, for example, a non-volatile memory device such as a flash memory.

Tag ID 231 is device identification information indicating a device ID unique to worker management device 200. Worker management device 200 is assigned the unique device ID. The device ID is an identification number for identifying worker management device 200 from other devices, and is, for example, a serial number such as a manufacturing number.

Visible light ID 232 is light source identification information included in the light received by light receiver 210. Specifically, visible light ID 232 is the latest one of light source identification information items sequentially extracted by controller 220 from the light received by light receiver 210.

Communication unit 240 is one example of a first communication unit connected to controller 220. Communication unit 240 is, for example, a communication module or a communication interface that supports a wireless communication standard such as Wi-Fi (registered trademark), Bluetooth (registered trademark), or ZigBee (registered trademark).

Communication unit 240 transmits the light source identification information extracted by controller 220. Specifically, communication unit 240 transmits, in association, tag ID 231 stored in storage 230 and the light source identification information extracted by controller 220. Note that only when the extracted light source identification information does not match visible light ID 232, does communication unit 240 transmit the light source identification information. This means that every time controller 220 obtains different light source identification information, communication unit 240 transmits such light source identification information.

Power supply 250 is for supplying electric power to each structural element of worker management device 200. Power supply 250 is, for example, connected to controller 220 and supplies electric power to controller 220, and further supplies electric power to light receiver 210, storage 230, and communication unit 240 via controller 220. For example, power supply 250 is a primary battery or a chargeable secondary battery. Alternatively, power supply 250 may be a solar cell that receives illuminating light and converts the illuminating light into electric power.

3. Worker Management System

Figure 6:
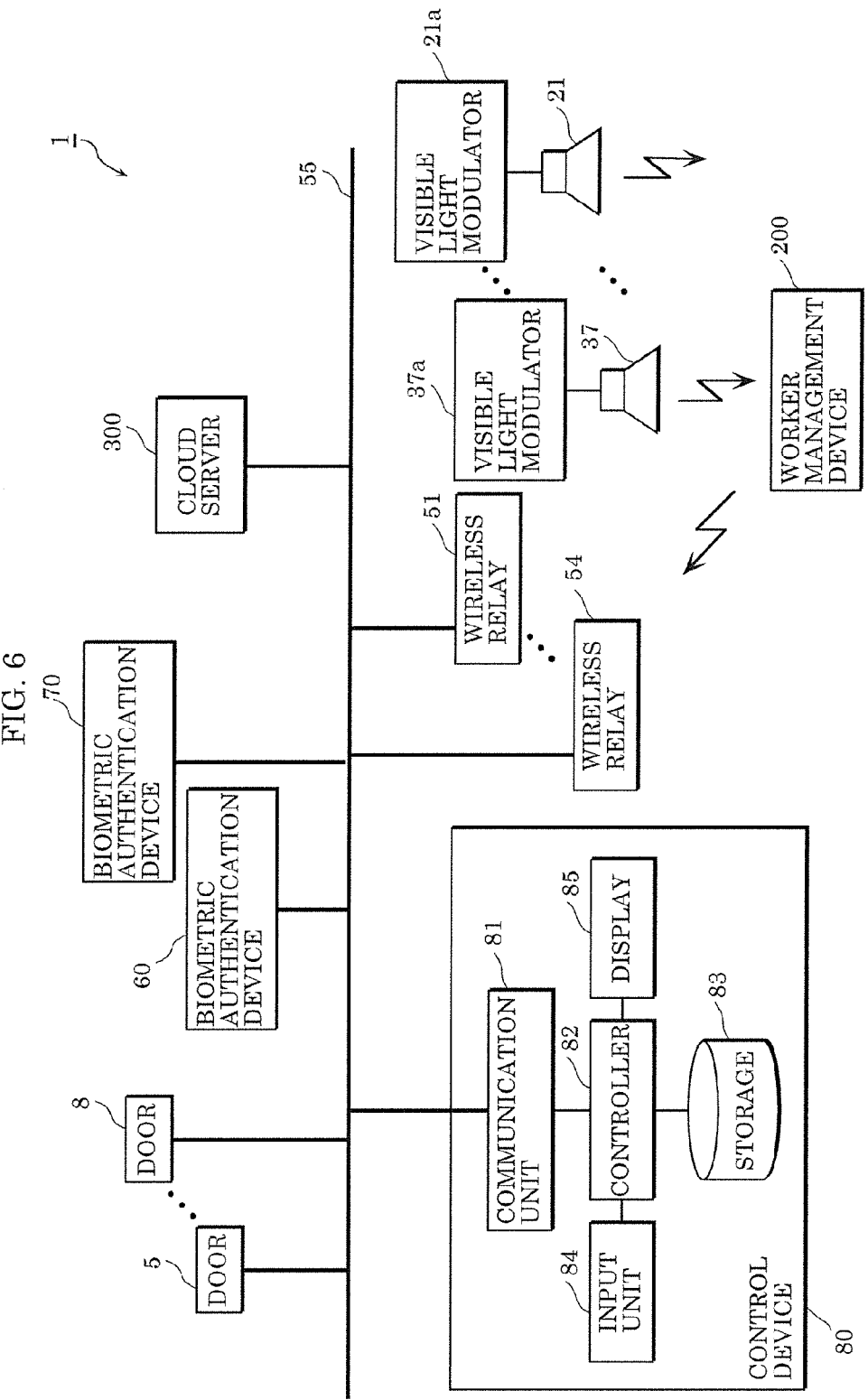
FIG. 6 illustrates a structure of a worker management system according to an embodiment of the present disclosure.

A structure of worker management system 1 according to the present embodiment is described with reference to FIG. 6. FIG. 6 illustrates a structure of worker management system 1 according to the present embodiment.

Worker management system 1 includes control device 80, worker management device 200, cloud server 300, lighting devices 21 to 37, visible light modulators 21a to 37a, wireless relays 51 to 54, doors 5 to 8, and biometric authentication devices 60 and 70. Control device 80, cloud server 300, wireless relays 51 to 54, doors 5 to 8, and biometric authentication devices 60 and 70 are connected by transmission cable 55. Note that FIG. 6 does not illustrate structural elements similar to that illustrated, such as lighting devices 22 to 36, for facilitating understanding of the drawing.

3-1. Control Device

Control device 80 communicates with worker management device 200. Specifically, control device 80 communicates with worker management device 200 by way of at least one of wireless relays 51 to 54. As illustrated in FIG. 6, control device 80 includes communication unit 81, controller 82, storage 83, input unit 84, and display 85.

3-1-1. Communication Unit

Communication unit 81 is one example of a second communication unit which communicates with communication unit 240 included in worker management device 200. Communication unit 81 is connected to transmission cable 55 and communicates with communication unit 240 via wireless relays 51 to 54. Communication unit 81 may be, for example, a communication module or a communication interface that supports a wireless communication standard such as Wi-Fi (registered trademark), Bluetooth (registered trademark), or ZigBee (registered trademark).

Communication unit 81 receives the light source identification information and the device identification information from communication unit 240. Specifically, communication unit 81 receives, via at least one of wireless relays 51 to 54, tag ID 231 and visible light ID 232 transmitted from communication unit 240 of worker management device 200. Communication unit 81 outputs received tag ID 231 and visible light ID 232 to controller 82.

Furthermore, communication unit 81 receives the result of the biometric authentication of worker 100 from biometric authentication device 60 or 70 by communicating with biometric authentication device 60 or 70. Communication unit 81 transmits an unlock instruction and a lock instruction to doors 5 to 8 by communicating with doors 5 to 8.

Furthermore, communication unit 81 communicates with cloud server 300. Communication unit 81 transmits worker log information and the like to cloud server 300.

3-1-2. Controller

Controller 82 is one example of a second controller connected to communication unit 81. Controller 82 is, for example, a processor such as a central processing unit (CPU).

Controller 82 stores the light source identification information and the device identification information received by communication unit 81, into predetermined storage in association with time information. Specifically, controller 82 stores tag ID 231 and visible light ID 232 received by communication unit 81, into at least one of storage 83 and cloud server 300 in association with the time information.

For example, every time communication unit 81 receives tag ID 231 and visible light ID 232, controller 82 stores tag ID 231 and visible light ID 232 into storage 83 in association with the time information. Furthermore, after every predetermined period, controller 82 transmits a set of tag ID 231, visible light ID 232, and the time information stored in storage 83 during the predetermined period, to cloud server 300 by way of communication unit 81, and stores the set into storage included in cloud server 300. To put it simply, controller 82 temporarily stores, into storage 83, data received from worker management device 200, and uploads, to cloud server 300, data (worker log information) accumulated during the predetermined period. The uploaded data may be deleted from storage 83.

The time information indicates, for example, time of reception by communication unit 81. Alternatively, communication unit 240 of worker management device 200 may transmit, as the time information, time at which light receiver 210 of worker management device 200 receives light.

The predetermined period is, for example, one day or one hour. Note that the predetermined period does not always need to be a fixed period and may be determined at random. Alternatively, controller 82 may upload data from storage 83 to cloud server 300 according to an instruction given from a manager, for example.

Furthermore, controller 82 controls unlocking and locking of doors 5 to 8 based on the light source identification information and the device identification information. Specifically, controller 82 generates an unlock instruction and a lock instruction for doors 5 to 8 and transmits the unlock instruction and the lock instruction to doors 5 to 8 by way of communication unit 81. For example, controller 82 generates the unlock instruction and the lock instruction for doors 5 to 8 based on, for example, the result of the biometric authentication performed by biometric authentication device 60 or 70.

3-1-3. Storage

Storage 83 is a memory in which data transmitted from worker management device 200 is stored as the worker log information. For example, storage 83 is a recording medium such as a flash memory or a hard disk drive (HDD).

Furthermore, a predetermined database may be stored in storage 83. For example, the predetermined database is a worker database in which a plurality of tag IDs 231 and a plurality of workers 100 are associated. This means that worker management device 200 may be associated in advance with each worker 100.

Note that the above-described biometric authentication database may be stored in storage 83. Note that controller 82 may edit the biometric authentication database based on an instruction given from input unit 84.

One example of the worker log information and the worker database is described later with reference to FIG. 7A and FIG. 7B.

3-1-4. Input Unit and Display

Input unit 84 is an interface that accepts an instruction from the manager. For example, input unit 84 is predetermined physical button, touch panel, or graphical user interface (GUI).

For example, input unit 84 accepts an instruction from the manager and outputs the instruction to controller 82. This causes controller 82 to, for example, edit the worker database or upload data to cloud server 300 based on the instruction given from the manager.

Display 85 is, for example, a monitor or a display for displaying predetermined information and the like to the manager. For example, display 85 displays the worker database, the worker log information, and the like according to an instruction or the like given via input unit 84.

3-2. Lighting Device

As described above, lighting devices 21 to 37 each have a unique ID and output visible light superimposed with the light source identification information indicating the unique ID. In other words, lighting devices 21 to 37 are each a light source for performing visible light communication.

Lighting devices 21 to 37 are connected to respective visible light modulators 21a to 37a. Visible light modulators 21a to 37a modulate visible light using the IDs unique to corresponding lighting devices.

For example, lighting devices 21 to 37 repeatedly transmit, in predetermined cycles, frames indicating the unique ID. Each of the frames is fixed length data including a preamble indicating the start of the frame, type information indicating a type of the frame, a payload indicating any information (that is visible light ID in this case), and an error detection code of the frame. The error detection code is a cyclic redundancy check (CRC) code, for example.

Visible light modulators 21a to 37a perform, as light intensity modulation, pulse position modulation (PPM) using a value of N (that is an integer greater than or equal to 2) in the present embodiment. For example, in 4 PPM, every symbol of a fixed length represents two bits. A modulation method, etc., for use in visible light communication is prescribed in the standard of Japanese Electronics and Information Technology Industries Association (JETTA), CP-1223 "Visible Light Beacon System," for example.

Thus, lighting devices 21 to 37 transmit the respective unique IDs, so that worker management device 200 obtains the unique ID included in the received light and can determine from which lighting device the received light is originated. This means that worker management device 200 is capable of determining the illumination area of which lighting device worker management device 200 is located in. In other words, worker management device 200 is capable of determining to which lighting device worker management device 200 is located close. Therefore, when receiving light from a lighting device, worker management device 200 can obtain position information indicating the current position of worker management device 200 itself.

3-3. Cloud Server

Cloud server 300 manages a predetermined database. For example, cloud server 300 includes storage such as a HDD. The storage accumulates, for example, the worker log information transmitted from communication unit 81 of control device 80.

For example, cloud server 300 may manage the worker log information by date or by tag ID. For example, when the worker log information is managed by date, attendance and absence of worker 100 can be managed.

When the worker log information is managed by tag ID, a trajectory of movement of worker 100 during work can be managed on per worker basis. This makes it possible to analyze, for example, whether worker 100 makes unnecessary moves during work. The result of the analysis can then be used for assistance with, for example, layout optimization including a position change of production lines 10 to 12 so that the unnecessary moves are reduced. Therefore, it is possible to improve work efficiency and increase factory productivity.

Note that the above-described worker database and biometric authentication database may be stored in cloud server 300. For example, when each database is updated by control device 80, the database stored in cloud server 300 is also updated.

4. Database

The database and the worker log information that are stored in at least one of storage 83 of control device 80 and cloud server 300 are described below.

4-1. Worker Log Information

FIG. 7A illustrates one example of the worker log information according to the present embodiment.

As illustrated in FIG. 7A, the worker log information associates each log identifier with the time information, the device identification information (the tag ID), the light source identification information (the visible light ID), and accompanying information. With this, the light source identification information and the time information associated with the same device identification information can be analyzed, for example, to track a trajectory of movement of worker management device 200, that is, worker 100, corresponding to the device identification information.

For example, an example illustrated in FIG. 7A shows that worker 100 wearing workwear 110 with attached thereto worker management device 200 corresponding to "tag 005" has passed by lighting devices corresponding to "light0036," "light0026," and "light0027" in this sequence. For example, assume that the last four digits of "lightXXXX" correspond to the reference numerals of lighting devices 21 to 37 illustrated in FIG. 1. The example shows that worker 100 corresponding to "tag005" passed through air shower room 3 equipped with lighting device 36, entered working room 2, passed by lighting device 26, and moved to an area near lighting device 27.

In the worker log information illustrated in FIG. 7A, "tag001" is included in only "log 00001." This shows that worker 100 corresponding to "tag001" has not moved from the area near lighting device 24. In other words, worker 100 can be regarded as doing a predetermined task at the work station of lighting device 24.

Thus, it is possible to track a trajectory of movement of worker 100 corresponding to the tag ID by tracking the visible light IDs in chronological order. Therefore, actions of worker 100 can be monitored and managed.

The accompanying information indicates, for example, processing executed at a corresponding point in time by controller 82. For example, the accompanying information includes information indicating unlocking and locking of the doors.

4-2. Worker Database

FIG. 7B illustrates one example of the worker database according to the present embodiment.

As illustrated in FIG. 7B, user information and the device identification information are associated in advance. For example, by referring to the worker database, controller 82 can determine whether an association between user information identified through the biometric authentication performed by biometric authentication device 60 or 70 and the device identification information transmitted from worker management device 200 is correct or incorrect. Therefore, controller 82 can control locking and unlocking of the doors based on the result of the determination, for example.

5. Operation

An operation of worker management system 1 according to the present embodiment is described below.

5-1. Operation of Worker Management Device

Figure 8:
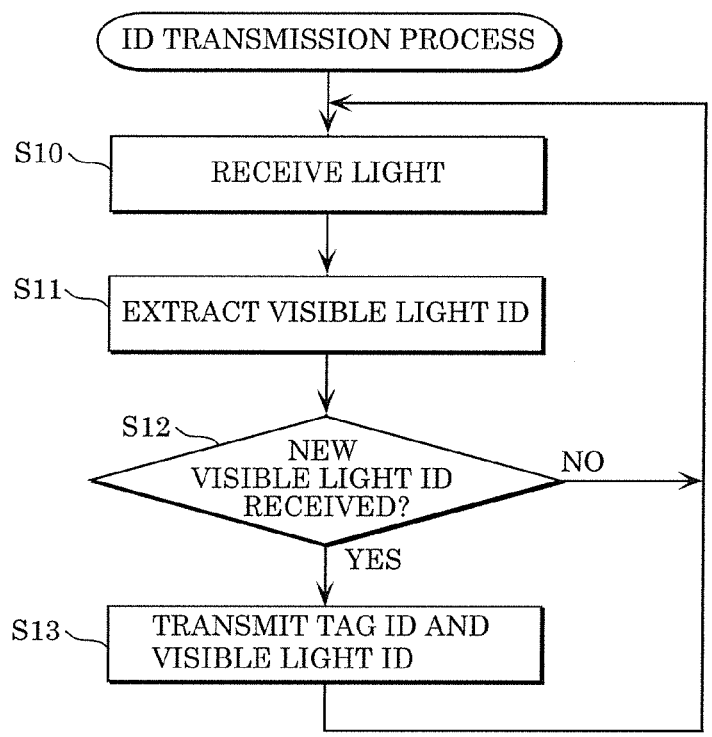
FIG. 8 is a flowchart illustrating an operation of a worker management device according to an embodiment of the present disclosure.

First, an operation of worker management device 200 in worker management system 1 is described with reference to FIG. 8. FIG. 8 is a flowchart illustrating an operation of worker management device 200 according to the present embodiment.

In worker management device 200, first, light receiver 210 receives visible light (S10). Next, controller 220 extracts the light source identification information (visible light ID) from the visible light received by light receiver 210 (S11).

Controller 220 determines whether or not the extracted visible light ID is new visible light ID (S12). Specifically, controller 220 determines whether or not the extracted visible light ID matches visible light ID 232 stored in storage 230.

When the extracted visible light ID matches visible light ID 232 (Yes in S12), controller 220 transmits the tag ID and the visible light ID by way of communication unit 240. Specifically, controller 220 reads tag ID 231 from storage 230, and transmits read tag ID 231 and the extracted visible light ID to control device 80.

When the extracted visible light ID does not match visible light ID 232 (No in S12), the processing returns to Step S10, and controller 220 discards the extracted visible light ID and waits for new light to be received.

In this way, when visible light ID included in the received visible light (illuminating light) is new, worker management device 200 can transmit the visible light ID and tag ID 231 to control device 80. When the received visible light ID is the same as visible light ID 232 stored in storage 230, no visible light ID or tag ID is transmitted. Therefore, it is possible to save electric power required for wireless communication.

Operation of Worker Management System

Worker management system 1 according to the present embodiment performs processing according to a room in which worker 100 is present. Specifically, worker management system 1 performs an entering process, an in-room process, and an exiting process. For example, the entering process, the in-room process, and the exiting process are performed when worker 100 is present in air shower room 3, working room 2, and exit room 4, respectively.

5-2-1. Entering Process

Figure 9:
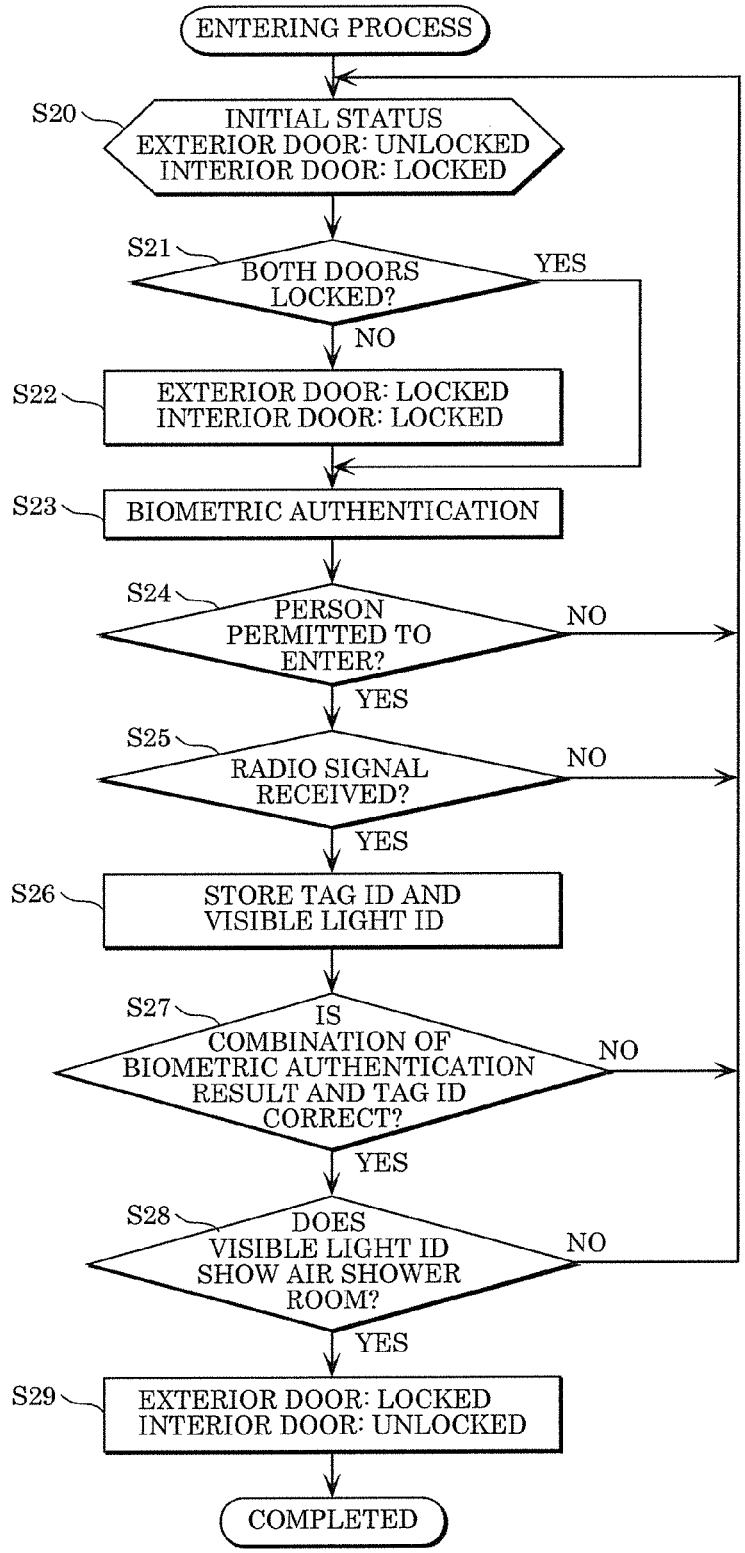
FIG. 9 is a flowchart illustrating an entering process that is performed in a worker management system according to an embodiment of the present disclosure.

First, a process for worker 100 to enter working room 2 (the entering process) is described with reference to FIG. 9. FIG. 9 is a flowchart illustrating the entering process that is performed in worker management system 1 according to the present embodiment.

In the initial status, exterior door 5 is unlocked, and interior door 6 to working room 2 is locked (S20). The entering process starts when worker 100 enters air shower room 3 to enter working room 2. It may be that door 5 is always locked and when worker 100 in front of door 5 is detected, door 5 is unlocked.

First, controller 82 detects that worker 100 entered air shower room 3, and determines whether or not both doors 5 and 6 are locked (S21). For example, a sensor is provided on door 5, and a signal indicating that door 5 was opened and worker 100 entered air shower room 3 through door 5 is output to controller 82. Controller 82 receives the signal and then determines that worker 100 entered air shower room 3.

When at least one of doors 5 and 6 is not locked (No in S21), controller 82 transmits lock instructions to both doors 5 and 6, thereby locking doors 5 and 6 (S22). When both doors 5 and 6 are locked (Yes in S21), the processing proceeds to the next process (the biometric authentication).

Note that the following describes an example in which worker 100 enters a room one by one, but this is not the only example. The entering process may be performed for a plurality of workers 100 at the same time.

Next, biometric authentication device 60 performs biometric authentication on worker 100 (S23). For example, biometric authentication device 60 first obtains biological data from worker 100. At this time, biometric authentication device 60 may guide worker 100 with audio or display indications. By doing so, it is possible to easily obtain the biological data on worker 100 that is required for the biometric authentication. Biometric authentication device 60 then compares the biometric authentication database and the biological data obtained from worker 100, thereby identifying personal information on worker 100. Biometric authentication device 60 outputs the identified personal information to control device 80 as a biometric authentication result.

Controller 82 receives the biometric authentication result by way of communication unit 81 and determines, based on the received biometric authentication result, whether or not worker 100 has been permitted to enter working room 2 (S24). For example, controller 82 determines whether or not worker 100 has been registered in the worker database. When worker 100 has been registered, controller 82 determines that worker 100 has been permitted to enter the room, and when worker 100 has not been registered, controller 82 determines that worker 100 has not been permitted to enter the room. In the worker database, each worker may be associated with information indicating presence or absence of permission to enter the room.

When controller 82 determines that worker 100 has not been permitted to enter the room (No in S24), the processing returns to Step S20, and controller 82 unlocks exterior door 5 to urge worker 100 to exit. At this time, controller 82 may display on display 85 that a person who has not been permitted to enter the room (what is called a suspicious individual) attempted to enter the room.

When controller 82 determines that worker 100 has been permitted to enter the room (Yes in S24), controller 82 determines whether or not a radio signal is received from worker management device 200 (S25). When no radio signal is received (No in S25), the processing returns to Step S20, and controller 82 unlocks exterior door 5 to urge worker 100 to exit. For example, the cause of failure to receive the radio signal includes malfunction or dead battery of worker management device 200. In this case, it is possible to urge worker 100 to exit and replace the worker management device with a proper worker management device.

When the radio signal is received (Yes in S25), controller 82 stores into storage 83 the tag ID and the visible light ID included in the received radio signal (S26).

Next, controller 82 determines whether or not the combination of the biometric authentication result and the tag ID is correct (S27). Specifically, controller 82 refers to the worker database and obtains the tag ID associated with the biometric authentication result (the personal information). Controller 82 then determines whether or not the tag ID associated with the biometric authentication result and the tag ID transmitted from worker management device 200 match each other. When the tag IDs match, controller 82 determines that the combination of the biometric authentication result and the tag ID is correct, and when the tag IDs do not match, controller 82 determines that the combination of the biometric authentication result and the tag ID is incorrect.

When the combination of the biometric authentication result and the tag ID is incorrect (No in S27), the processing returns to Step S20, and controller 82 unlocks exterior door 5 and urges worker 100 to exit. For example, the probable cause of the combination being incorrect is worker 100 wearing others' workwear 110 by mistake or workwear 110 having others' worker management device 200 attached thereto. In this case, it is possible to urge worker 100 to exit and replace the worker management device with proper worker management device 200.

When the combination of the biometric authentication result and the tag ID is correct (Yes in S27), controller 82 determines whether or not the obtained visible light ID is unique to lighting device 36 installed in air shower room 3 (S28). By doing so, it is possible to confirm that worker management device 200 that has transmitted the visible light ID in association with the tag ID is present in air shower room 3.

When visible light ID is not unique to lighting device 36 (No in S28), the processing returns to Step S20, and controller 82 unlocks exterior door 5 and urges worker 100 to exit. When visible light ID is unique to lighting device 36 (Yes in S28), controller 82 unlocks door 6 to working room 2 (S29). This allows worker 100 to enter working room 2.

In air shower room 3, the blower is operated to blow fresh air toward worker 100 before door 6 to working room 2 is unlocked (before S29). For example, it is sufficient that controller 82 operates the blower to blow fresh air when visible light ID is unique to lighting device 36 (Yes in S28).

5-2-2. In-Room Process

Figure 10:
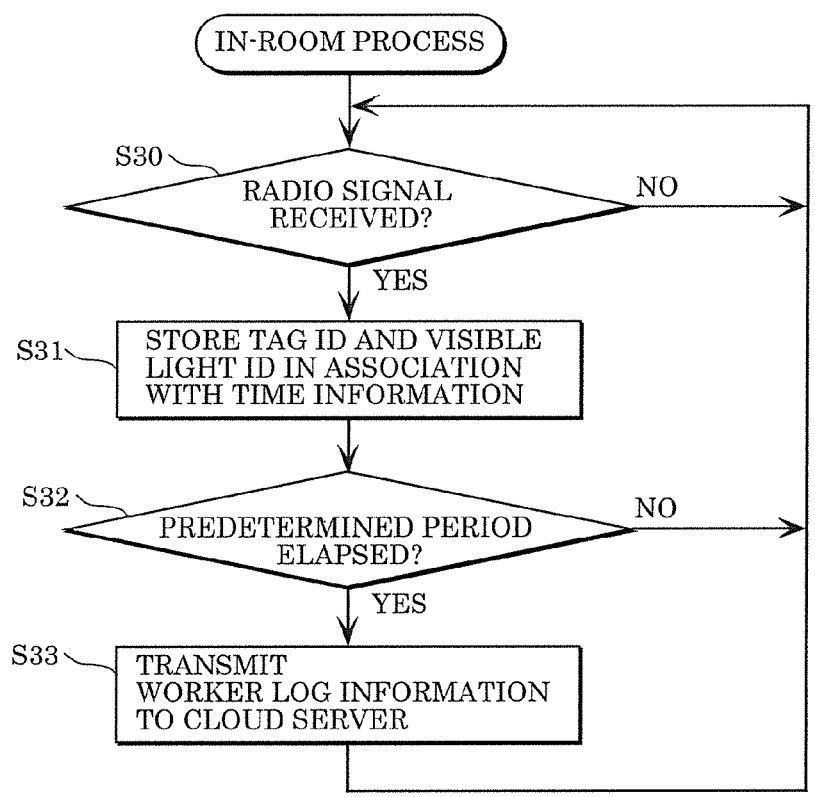
FIG. 10 is a flowchart illustrating an in-room process that is performed in a worker management system according to an embodiment of the present disclosure.

Next, a process performed while worker 100 is in working room 2 (the in-room process) is described with reference to FIG. 10. FIG. 10 is a flowchart illustrating the in-room process that is performed in worker management system 1 according to the present embodiment.

First, control device 80 waits for communication unit 81 to receive a radio signal from worker management device 200 (No in S30). When a radio signal is received (Yes in S30), controller 82 stores into storage 83 the tag ID and the visible light ID included in the received radio signal, in association with the time information (S31).

Next, controller 82 determines whether or not a predetermined period has elapsed (S32). Specifically, controller 82 determines whether or not this is the time for the worker log information stored in storage 83 to be uploaded to cloud server 300. Note that this determination may be performed regardless of whether or not a radio signal is received, for example.

When the predetermined period has not elapsed (No in S32), the processing returns to Step S30, and controller 82 waits for radio signal reception. Through repetition of Step S30 to Step S32, the worker log information such as that illustrated in FIG. 7A is stored into storage 83.

When the predetermined period has elapsed (Yes in S32), for example, at the time when work for the day is completed, controller 82 reads the worker log information from storage 83 and transmits the worker log information to cloud server 300 by way of communication unit 81 (S33). Cloud server 300 accumulates the worker log information transmitted thereto in the storage, and manages the worker log information.

5-2-3. Exiting Process

Figure 11:
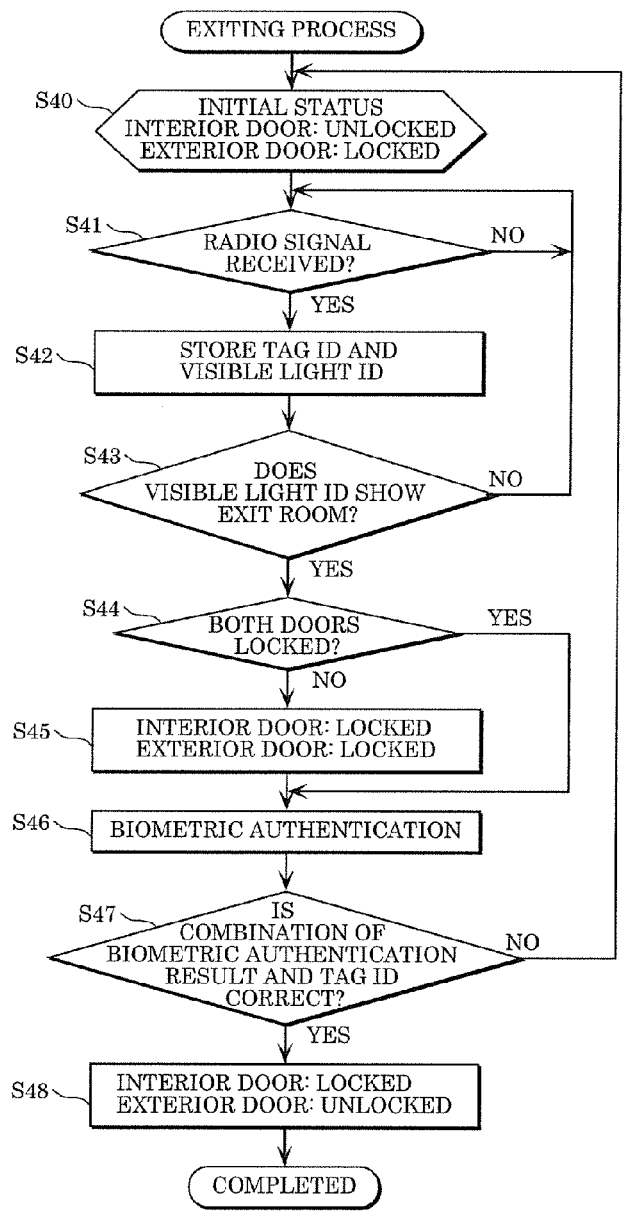
FIG. 11 is a flowchart illustrating an exiting process that is performed in a worker management system according to an embodiment of the present disclosure.

Next, a process for worker 100 to exit working room 2 (the exiting process) is described with reference to FIG. 11. FIG. 11 is a flowchart illustrating the exiting process that is performed in worker management system 1 according to the present embodiment.

In the initial status, door 7 to working room 2 is unlocked, and exterior door 8 is locked (S40). The exiting process starts when worker 100 enters exit room 4 to exit working room 2 (or to get out of the factory).

First, controller 82 waits for a radio signal to be received from worker management device 200 (No in S41). When a radio signal is received (Yes in 841), controller 82 stores into storage 83 the tag ID and the visible light ID included in the received radio signal, in association with the time information (S42). Controller 82 determines whether or not the obtained visible light ID is unique to lighting device 37 installed in exit room 4 (S43).

When the visible light ID is not unique to lighting device 37 (No in S43), the processing returns to Step S41, and controller 82 waits for radio signal reception.

When the visible light ID is unique to lighting device 37 (Yes in S43), it is regarded that worker 100 entered exit room 4, and controller 82 determines whether or not both doors 7 and 8 are locked (S44). When at least one of doors 7 and 8 is not locked (No in S44), controller 82 transmits lock instructions to both doors 7 and 8, thereby locking doors 7 and 8 (S45). When both doors 7 and 8 are locked (Yes in S44), the next process (the biometric authentication) begins.

Next, biometric authentication device 70 performs biometric authentication of worker 100 (S46). A specific operation of biometric authentication device 70 is the same as that of biometric authentication device 60 installed in air shower room 3.

Controller 82 determines whether or not the combination of the biometric authentication result and the tag ID received by way of communication unit 81 is correct (S47). The specific operation is the same as the determination (S27) in the entering process illustrated in FIG. 9.

When the combination of the biometric authentication result and the tag ID is incorrect (No in S47), the processing returns to Step S40, and controller 82 unlocks door 7 to working room 2, and does not allow worker 100 to exit to the outside. For example, when worker 100 commits wrongdoing such as exchanging worker management device 200 with other workers inside working room 2, this determination makes it possible to not allow worker 100 to exit.

When the combination of the biometric authentication result and the tag ID is correct (Yes in S47), controller 82 unlocks exterior door 8 (S48). This allows worker 100 to exit working room 2 to the outside through exit room 4.

Note that controller 82 may determine which of the above-described entering process, in-room process, and exiting process is to be performed, for example, based on the visible light ID included in the radio signal. Specifically, when the visible light ID included in the radio signal is unique to lighting device 36 in air shower room 3, controller 82 performs the entering process. When the visible light ID included in the radio signal is unique to any of lighting devices 21 to 35 in working room 2, controller 82 performs the in-room process. When the visible light ID included in the radio signal is unique to lighting device 37 in exit room 4, controller 82 performs the exiting process.

6. Summary

As described above, worker management device 200 according to the present embodiment is for managing worker 100 wearing workwear 110 and includes: main body 201: attachment element 202 that is provided on a part of main body 201 and attaches main body 201 to workwear 110; light receiver 203 that is provided on a part of main body 201 and receives light including identification information which is predetermined, the part of main body 201 being exposed when main body 201 is attached to workwear 110 by attachment element 202; controller 220 connected to light receiver 203; and communication unit 240 connected to controller 220.

For example, generally speaking, a plurality of workers 100 in food factories and so on often work dressing the same. Specifically, the plurality of workers 100 in working room 2 wear the same or like workwear 110. The same or like workwear 110 means clothing that is the same or similar in shape and color and, for example, is indistinguishable in one glance through a surveillance camera or the like. Therefore, it is difficult to manage the plurality of workers 100 on a per worker basis with the use of surveillance cameras or the like.

In contrast, the use of worker management device 200 according to the present embodiment enables proper management on actions of workers on a per worker basis.

For example, the position of worker management device 200 can be located based on the identification information included in the received light. Therefore, when the identification information obtained by worker management device 200 is managed in chronological order, a trajectory of movement of worker management device 200 can be obtained. With this, it is possible to manage actions of worker 100 wearing workwear 110 having worker management device 200 attached thereto.

For example, whether or not the movement of worker 100 includes unnecessary moves can be analyzed through management on actions of the plurality of workers 100. When the movement of the plurality of works 100 includes unnecessary moves, measures can be taken including changing the layout of working room 2, i.e., positions of production lines 10 to 12 therein, so as to assist improve work efficiency and productivity.

For example, attachment element 202 is provided on a bottom portion of main body 201, and light receiver 203 is provided on a top portion or a side portion of main body 201.

This allows light receiver 203 to receive light more easily, so that the identification information can be efficiently obtained.

For example, the identification information is light source identification information indicating an ID unique to a light source that outputs the light, controller 220 extracts the light source identification information from the light received by light receiver 203, and communication unit 240 transmits the light source identification information extracted by controller 220.

Consequently, control device 80 that communicates worker management device 200 can manage actions of worker 100 based on the light source identification information, for example. For example, control device 80 obtains from a plurality of worker management devices 200 the light source identification information obtained by each of the plurality of worker management devices 200, and thereby can manage actions of a plurality of workers 100 associated with the plurality of worker management devices 200.

For example, worker management device 200 further includes storage 230 that stores device identification information indicating a device ID unique to worker management device 200, and communication unit 240 transmits the light source identification information and the device identification information in association.

Consequently, since the device identification information and the light source identification information are associated with each other, control device 80 can easily manage the light source identification information on a per worker management device basis, for example.

For example, the light is visible light (illuminating light).

Consequently, the use of visible light allows worker 100 to know a communication area, for example, which is different from a case where wireless communication is used. In detail, since an area illuminated with visible light (the illumination area), that is, the communication area, is visible to the eyes, worker 100 can visually know whether or not the visible light communication is being performed.

For example, the lighting device illuminates the work station of worker 100 with visible light, and worker 100 understands that worker 100 needs to be at the work station to enable the visible light communication. Therefore, it is possible to implicitly encourage worker 100 to work at the work station, thereby promoting compliance with work requirements.

Furthermore, for example, if wireless communication is used as a medium including the identification information, communication across floors is possible, causing a risk of the identification information being obtained from an upper or lower floor. In contrast, when visible light is used, for example, communication across floors is not possible, meaning that even a position on a floor of a multi-level factory can be located, for example.

For example, worker management system 1 according to the present embodiment includes: worker management device 200; lighting devices 21 to 37 that output the light including the identification information; and control device 80 that communicates with worker management device 200 and includes (i) communication unit 81 that communicates with communication unit 240 and (ii) communication unit 82 connected to communication unit 81.

With this, as described above, actions of workers can be properly managed on a per worker basis. Furthermore, it is possible to assist improve work efficiency and productivity.

Furthermore, for example, the identification information is light source identification information indicating an ID unique to each of lighting devices 21 to 37, and communication unit 81 receives from communication unit 240 the light source identification information and device identification information indicating a device ID unique to worker management device 200, and controller 82 stores into storage 83 the light source identification information and the device identification information received by communication unit 81, in association with time information.

With this, the identification information obtained by worker management device 200 is managed in chronological order so that a trajectory of movement of worker management device 200 can be obtained. Therefore, it is possible to properly manage actions of worker 100 wearing workwear 110 having worker management device 200 attached thereto.

Furthermore, for example, controller 82 controls, based on the light identification information and the device identification information, unlocking and locking of door 6 or 8 provided in a room where at least one of lighting devices 21 to 37 is installed.

With this, for example, entry and exit from working room 2 can be managed. Therefore, for example, it is possible that only workers permitted in advance are allowed to enter and a suspicious individual is restricted from entering.

Furthermore, for example, worker management system 1 further includes cloud server 300 including storage.

With this, for example, a large amount of data can also be managed, and therefore it is possible to easily perform various types of management such as attendance and absence of many workers.

Furthermore, for example, lighting devices 21 to 37 are each a lighting device that outputs visible light.

With this, for example, the use of visible light enables to encourage worker 100 to comply with work requirements as described above. Furthermore, even a position on a floor of a multi-level factory or the like can be located.

Furthermore, for example, worker management system 1 further includes wireless relays 51 to 54 that relay communication between communication unit 240 and communication unit 81.

With this, when at least one of wireless relays 51 to 54 relays communication, communication between a plurality of worker management devices 200 and control device 80 can be easily performed, for example.

7-1. First Variation

Figure 12A:
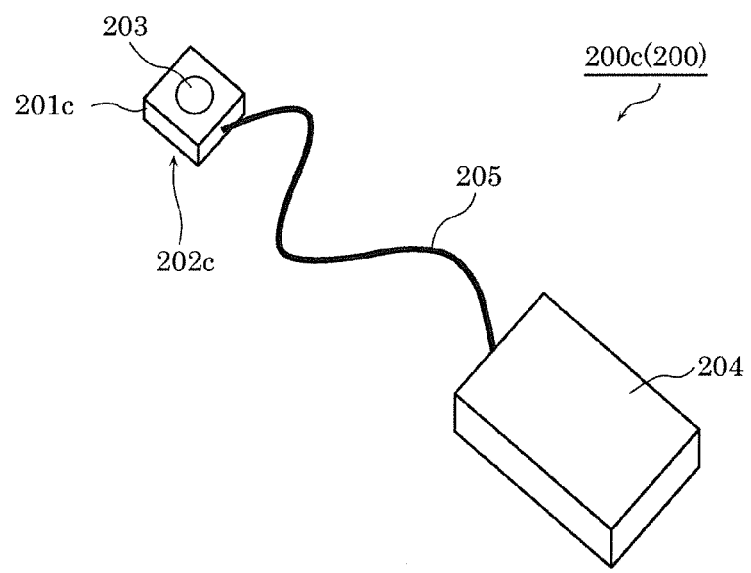
FIG. 12A is a perspective view illustrating an outer appearance of a worker management device according to a variation of an embodiment of the present disclosure.
Figure 12B:
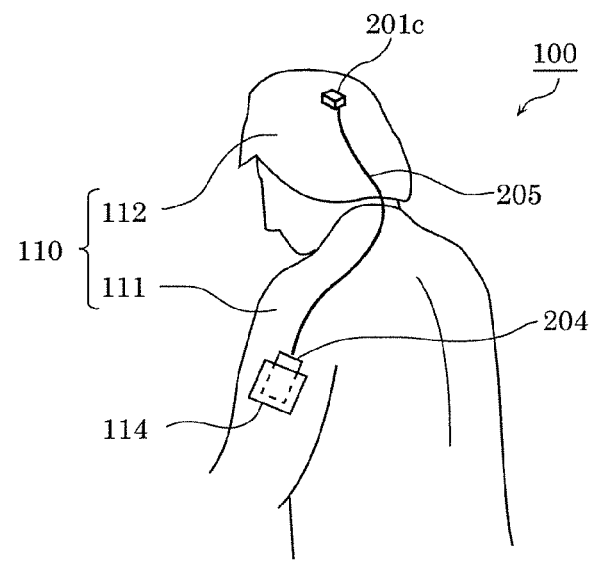
FIG. 12B is a perspective view illustrating an example in which a worker management device is attached to workwear according to a variation of an embodiment of the present disclosure.

A variation of worker management device 200 according to the present embodiment is described below with reference to FIG. 12A and FIG. 12B. FIG. 12A is a perspective view illustrating an outer appearance of worker management device 200c according to the present variation. FIG. 12B is a perspective view illustrating an example in which worker management device 200c is attached to workwear 110 according to the present variation.

For example, in worker management device 200 according to the present embodiment, light receiver 203, controller 220, and the like are provided in one housing (main body 201) as illustrated in FIG. 3A and FIG. 3B. However, as in worker management device 200c according to the present variation, light receiver 203, controller 220, and the like may be separately provided as illustrated in FIG. 12A.

Worker management device 200c includes first main body 201c, attachment element 202c, light receiver 203, second main body 204, and connecting line 205. Note that the following description will focus on differences from worker management device 200 according to the above embodiment.

First main body 201c is a housing in the form of a substantial rectangular parallelepiped, for example. On first main body 201c, power supply 250 and the like are not provided, and only light receiver 203 is provided. Therefore, first main body 201c is smaller and lighter than main body 201 illustrated in FIG. 3A and FIG. 3B. First main body 201c is, for example, made of a resin material such as plastic.

Attachment element 202c is a member provided on a part of first main body 201c, for attaching first main body 201 to workwear 110. For example, attachment element 202c is a hook-and-loop fastener as with attachment element 202 according to the above embodiment. Since first main body 201c is smaller than main body 201, the area of attachment element 202c is also smaller.

Second main body 204 is a housing in the form of a substantial rectangular parallelepiped, for example. Second main body 204 incorporates a communication module (communication unit 240), a microcomputer (controller 220), and a battery (power supply 250), for example. For example, second main body 204 is made of a resin material such as plastic. Note that the shape of first main body 201c and second main body 204 is one example and may be any other shapes.

Connecting line 205 is a cable that connects light receiver 203 and controller 220 incorporated in second main body 204. For example, light receiver 203 generates an electrical signal by performing photoelectric conversion on received light. Light receiver 203 then outputs the generated electrical signal to controller 220 through connecting line 205. Furthermore, electric power from power supply 250 incorporated in second main body 204 is supplied to light receiver 203 through connecting line 205.

The attachment element such as a hook-and-loop fastener does not need to be provided on second main body 204. Since light receiver 203 is not provided on second main body 204, a part of second main body 204 on which light receiver 203 would be provided does not need to be exposed when second main body 204 is attached to workwear 110. Therefore, second main body 204 may be received in pocket 114 of workwear 110, for example, as illustrated in FIG. 12B.

Furthermore, first main body 201c is attached to cap 112 as illustrated in FIG. 12B. As compared to main body 201 according to the embodiment, first main body 201c is smaller and lighter, and therefore places less load on worker 100.

Connecting line 205 is adjusted in length so as to extend from cap 112 to pocket 114 on jacket 111, for example. Connecting line 205 may be pinned to cap 112 and jacket 111 midway along the length in order not to trouble worker 100 during work. For example, jacket 111 may have a hole for inserting connecting line 205. Alternatively, connecting line 205 may be held down to jacket 111 or cap 112 with a hold-down element such as a clip.

8. Second Variation

The above embodiment has described a case where worker 100 and worker management device 200 (tag ID 231) are associated in advance. In detail, worker 100 is obliged to wear workwear 110 having previously assigned worker management device 200 attached thereto, for example, in the above embodiment.

However, in the present variation, worker 100 can freely choose workwear 110 to wear. This means that worker 100 and worker management device 200 (tag ID 231) are not associated in advance in the present variation.

Specifically, in the present variation, worker 100 and worker management device 200 are associated upon entry to the room.

Figure 13:
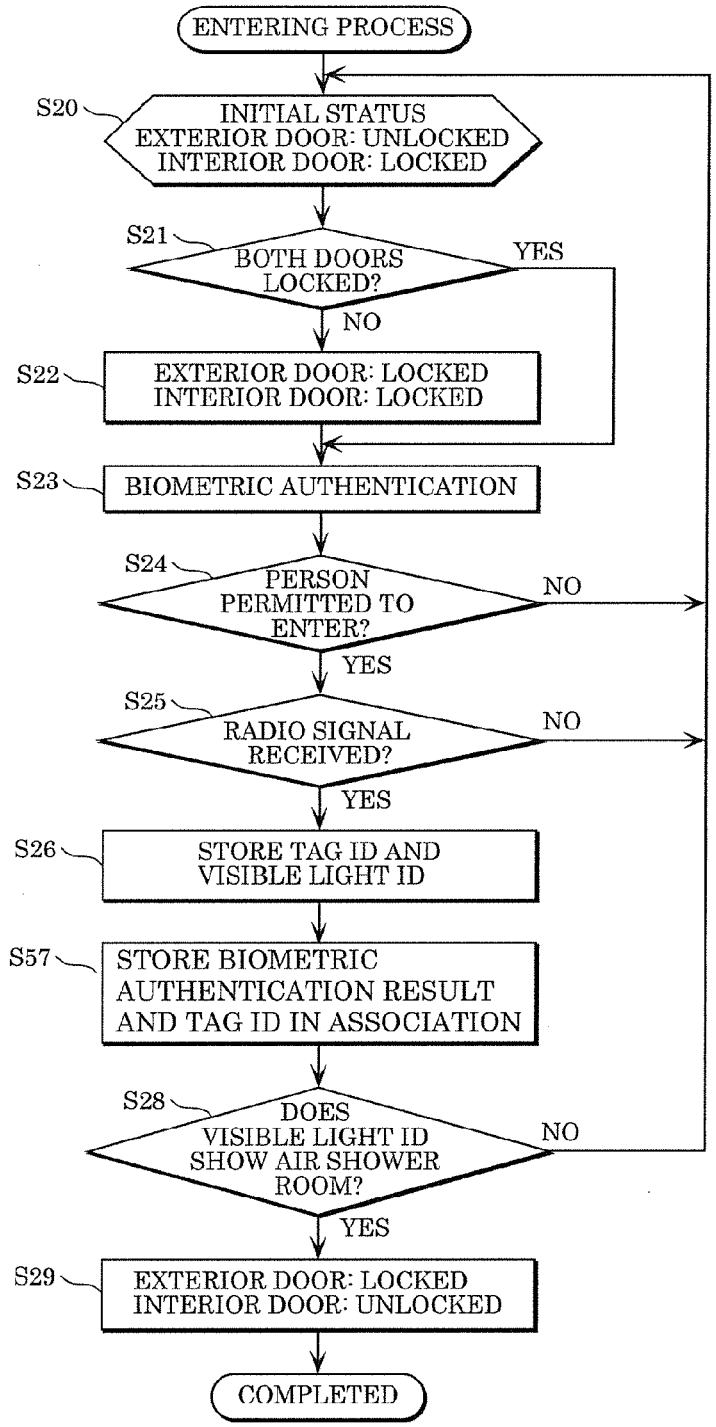
FIG. 13 is a flowchart illustrating an entering process that is performed in a worker management system according to a variation of an embodiment of the present disclosure.

FIG. 13 is a flowchart illustrating an entering process that is performed in a worker management system according to the present variation. As illustrated in FIG. 13, processing up to storing of the tag ID and the visible light ID (S26) is the same as that in the entering process illustrated in FIG. 9.

After Step S26, controller 82 stores into storage 83 the biometric authentication result and the tag ID in association (S57). Specifically, controller 82 associates worker management device 200 associated with the tag ID, and worker 100 who carries worker management device 200. In short, in the present variation, the worker database is generated and stored when worker 100 enters the room, instead of the worker database illustrated in FIG. 7A being stored in advance.

The subsequent processing is the same as that in the entering process illustrated in FIG. 9.

With this, for example, even a person not registered in advance (an unregistered person), such as a person who visits the factory for inspection, can enter working room 2. Furthermore, since even an unregistered person can be associated with the tag ID when entering the room, actions of the unregistered person can be managed.

When the combination of the biometric authentication result and the tag ID is determined to be incorrect (No in S27) in the entering process illustrated in FIG. 9, the biometric authentication result and the tag ID may be stored into storage 83 in association as in Step S57 in the present variation. In short, when an unregistered person enters the room, the worker database may be updated to add and register the unregistered person.

Second Embodiment

The following describes a worker management system according to a second embodiment, and a worker management device and workwear that are used in the worker management system. Note that the following description will focus on differences from the first embodiment, and the same constituents as those in the first embodiment are denoted by the same numerals and symbols so that description thereof is omitted or simplified.

1. Worker Management System

Figure 14:
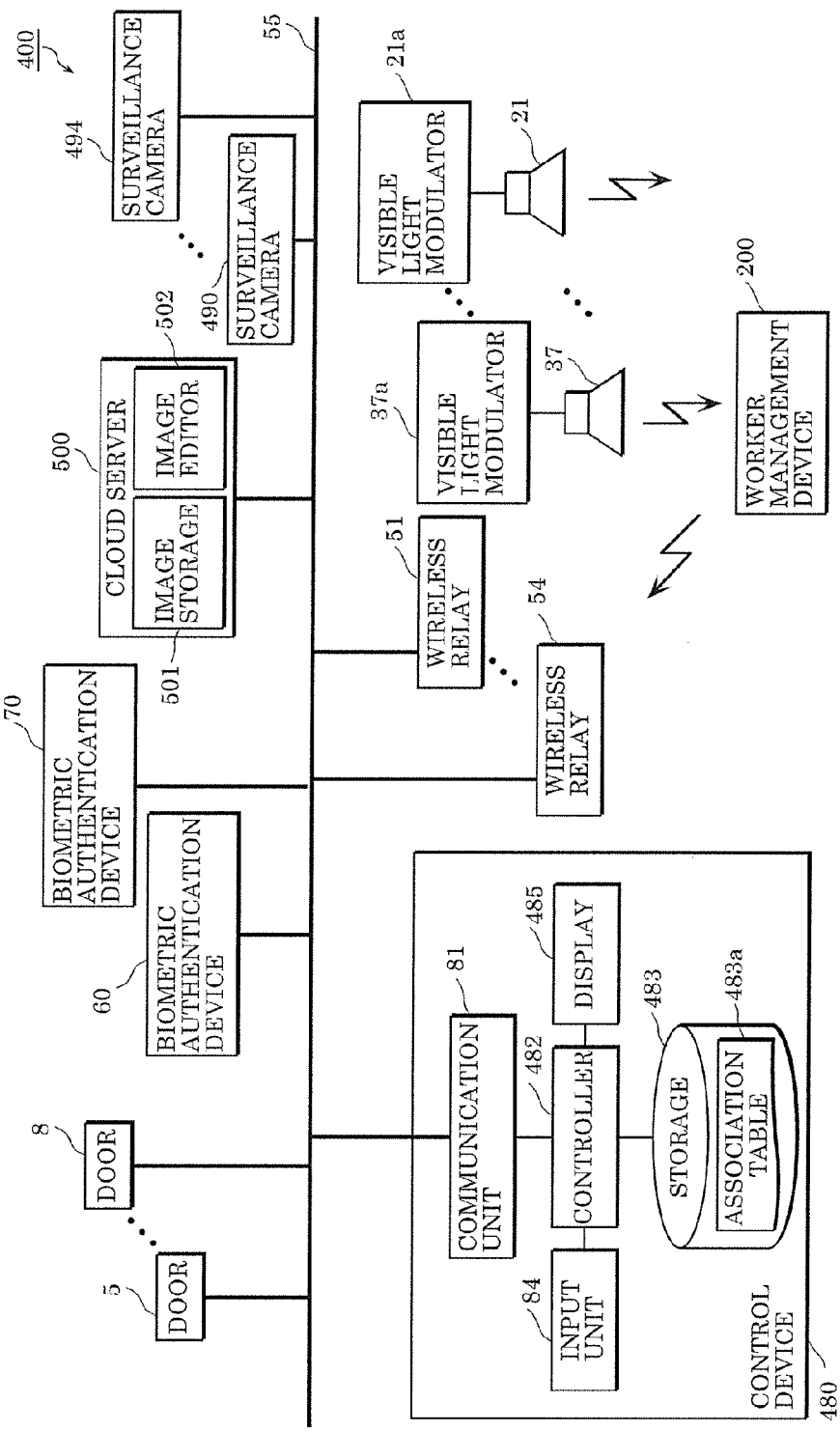
FIG. 14 illustrates a structure of a worker management system according to an embodiment of the present disclosure.
Figure 15:
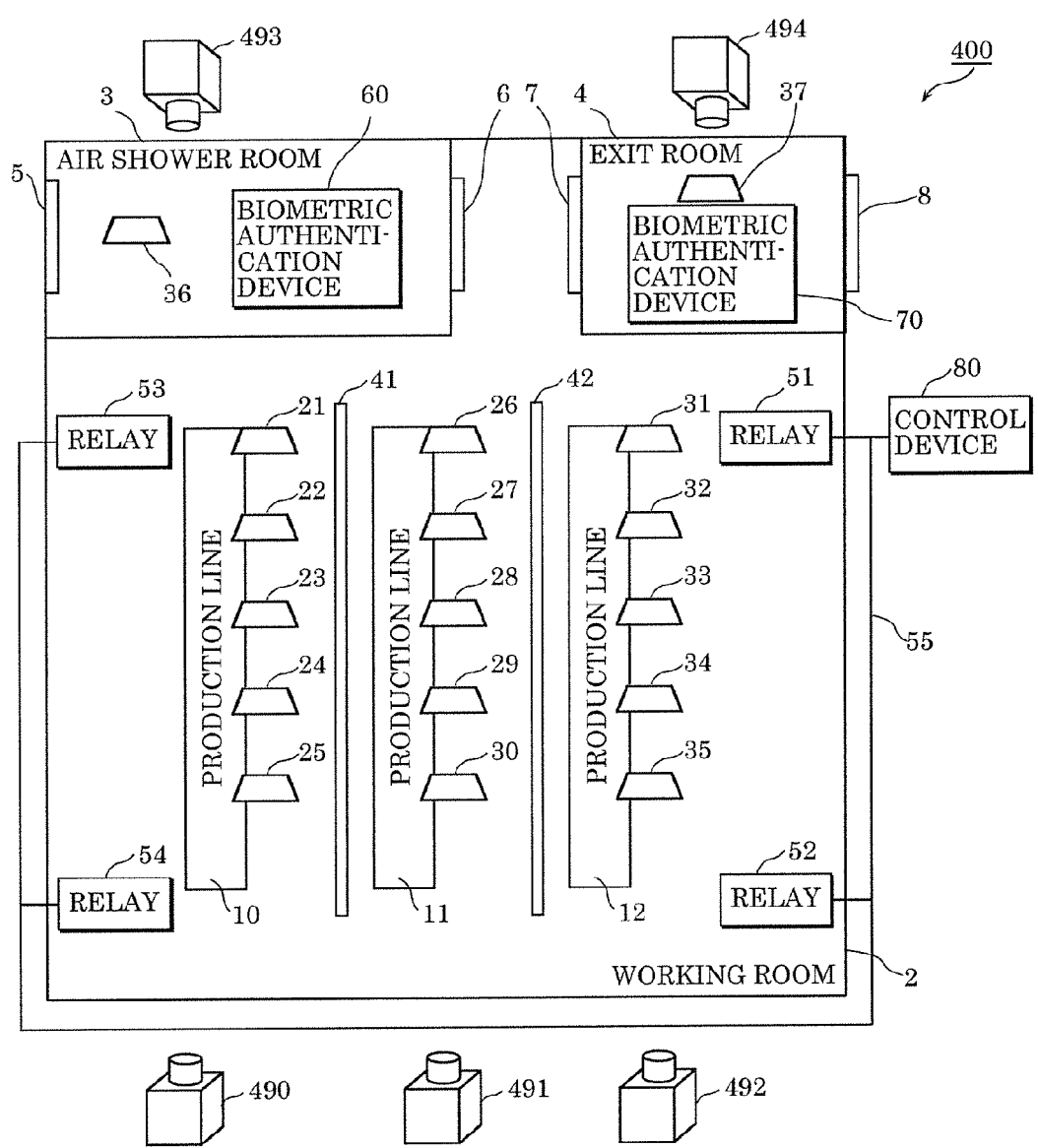
FIG. 15 is a schematic plan view of a factory that uses a worker management system according to an embodiment of the present disclosure.

FIG. 14 illustrates a structure of worker management system 400 according to the present embodiment. FIG. 15 is a schematic plan view of a factory that uses worker management system 400 according to the present embodiment.

As illustrated in FIG. 14, worker management system 400 includes control device 480 and cloud server 500 instead of control device 80 and cloud server 300 as compared to worker management system 1 according to the first embodiment. Furthermore, worker management system 400 additionally includes surveillance cameras 490 to 494.

1-1. Surveillance Camera

Surveillance cameras 490 to 494 are one example of cameras that capture images of light-receiving spaces (illumination areas) that are different from each other. The light-receiving space is a space where light from at least one of a plurality of lighting devices 21 to 37 is receivable. In other words, each of surveillance cameras 490 to 494 is associated with one or more lighting devices. In the present embodiment, surveillance cameras 490 to 494 are disposed as illustrated in FIG. 15 so as to capture images of spaces that are different from each other inside the factory.

Surveillance cameras 490 to 494 are each assigned a unique camera number. Specifically, the camera numbers of surveillance cameras 490 to 494 are "CA0490" to "CA0494," respectively. An image (image data) captured by each of surveillance cameras 490 to 494 is recorded on cloud server 500.

Surveillance camera 490 captures an image of the light-receiving space where light from each of five lighting devices 21 to 25 is receivable. Specifically, surveillance camera 490 captures images of areas near five lighting devices 21 to 25. For example, surveillance camera 490 captures an image of an area near production line 10.

Surveillance camera 491 captures an image of the light-receiving space where light from each of five lighting devices 26 to 30 is receivable. Specifically, surveillance camera 491 captures images of areas near five lighting devices 26 to 30. For example, surveillance camera 491 captures an image of an area near production line 11.

Surveillance camera 492 captures an image of the light-receiving space where light from each of five lighting devices 31 to 35 is receivable. Specifically, surveillance camera 492 captures images of areas near five lighting devices 31 to 35. For example, surveillance camera 492 captures an image of an area near production line 12.

Surveillance camera 493 captures an image of the light-receiving space where light from lighting device 36 is receivable. Specifically, surveillance camera 493 captures an image of an area near lighting device 36. For example, surveillance camera 493 captures an image of the inside of air shower room 3.

Surveillance camera 494 captures an image of the light-receiving space where light from lighting device 37 is receivable. Specifically, surveillance camera 494 captures an image of an area near lighting device 37. For example, surveillance camera 494 captures an image of the inside of exit room 4.

Note that five surveillance cameras 490 to 494 are provided in the present embodiment, but the number of surveillance cameras is not limited to this example. It is sufficient that worker management system 400 includes a plurality of surveillance cameras. Furthermore, the positions of the plurality of surveillance cameras are not limited to those in the example illustrated in FIG. 15. For example, the plurality of surveillance cameras may be provided one-to-one with the plurality of lighting devices.

1-2. Control Device

As compared to control device 80 according to the first embodiment, control device 480 includes, as illustrated in FIG. 14, controller 482, storage 483, and display 485, instead of controller 82, storage 83, and display 85. Main functions of controller 482, storage 483, and display 485, are the same as those of controller 82, storage 83, and display 85. The following description will focus on differences.

1-2-1. Controller

With reference to association table 483a, controller 482 identifies a surveillance camera that captures an image of the light-receiving space of the lighting device corresponding to the light identification information (the visible light ID) associated with the device identification information (the tag ID). Controller 482 outputs, to display 485, an image captured by the identified surveillance camera. When a change occurs in the visible light ID associated with the tag ID, controller 482 identifies a surveillance camera corresponding to the visible light ID after the change, and outputs, to display 485, the image captured by the identified surveillance camera.

Figure 16:
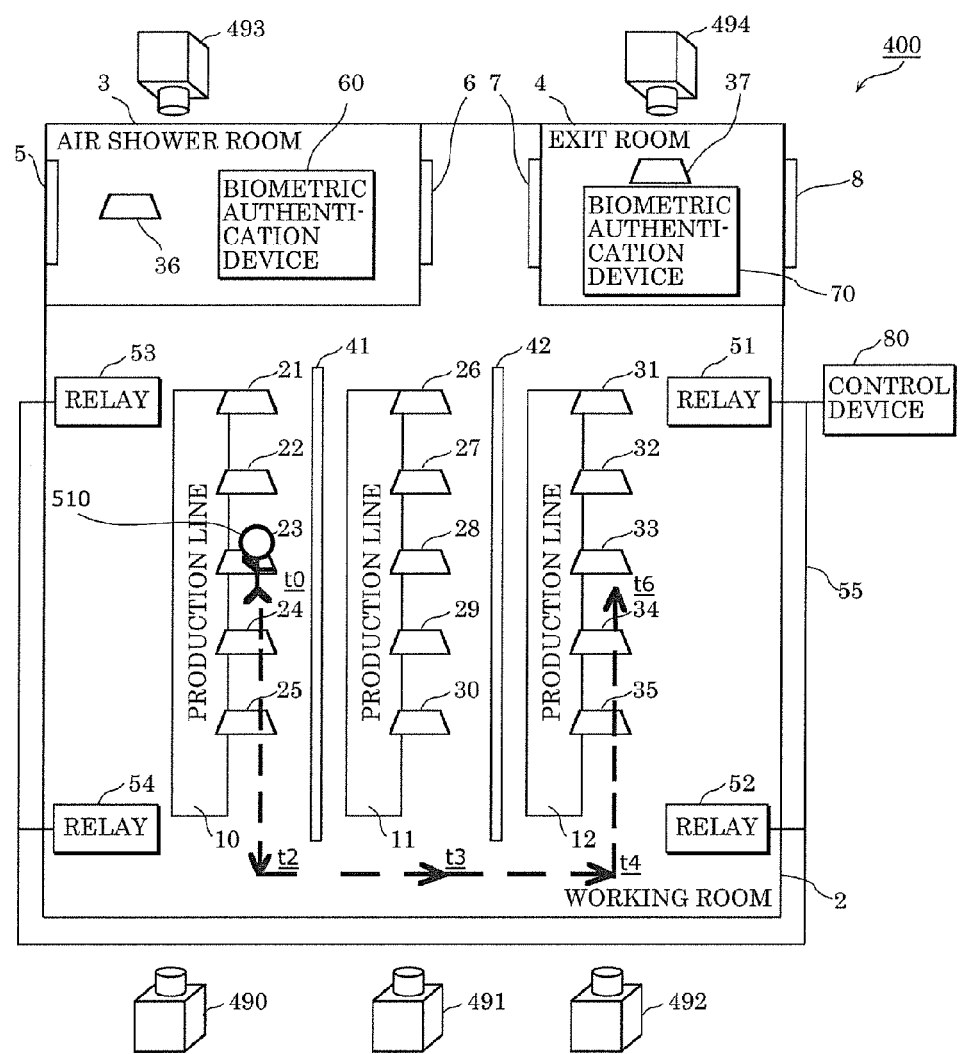
FIG. 16 illustrates movement of a specific worker inside a factory according to an embodiment of the present disclosure.

The following describes, as one example, a case where specific worker 510 moves inside the factory along the bold dashed-line arrow in FIG. 16. FIG. 16 illustrates movement of specific worker 510 inside the factory according to the present embodiment.

In the present embodiment, controller 482 generates or obtains log information on specific worker 510. Specific worker 510 is one worker among one or more workers present inside the factory. For example, controller 482 accepts a user operation that designates a worker to be monitored, and determines, as specific worker 510, the worker designated in the accepted user operation.

Controller 482 obtains the tag ID of specific worker 510 with reference to the worker database illustrated in FIG. 7B, for example. Controller 482 extracts the visible light ID and the time information associated with the tag ID of specific worker 510, with reference to the worker log information illustrated in FIG. 7A, for example. By doing so, log information on specific worker 510 illustrated in FIG. 17, for example, is generated.

FIG. 17 illustrates the log information on specific worker 510 according to the present embodiment. Specifically, FIG. 17 illustrates log information on specific worker 510 having moved inside the factory along the bold dashed-line arrow in FIG. 16.

Controller 482 obtains a temporal change in the visible light ID with reference to the log information on specific worker 510. Every time a change occurs in the visible light ID, controller 482 obtains a camera number associated with the visible light ID after the change, with reference to association table 483a, and outputs, to display 485, an image captured by the surveillance camera corresponding to the obtained camera number.

1-2-2. Storage

Storage 483 stores association table 483a as illustrated in FIG. 14. Furthermore, storage 483 may store the log information on specific worker 510.

Association table 483a shows associations between the plurality of lighting devices 21 to 37 and the plurality of surveillance cameras 490 to 494 as illustrated in FIG. 18. FIG. 18 illustrates association table 483a associating visible light IDs and camera numbers according to the present embodiment.

In the present embodiment, association table 483a associates each of the visible light IDs with one of the camera numbers. Specifically, a visible light ID is associated with a camera number of the surveillance camera that captures an image of the light-receiving space where light from the lighting device identified by the visible light ID is receivable.

For example, as illustrated in FIG. 15, surveillance camera 490 captures an image of the light-receiving space corresponding to lighting device 21. Therefore, the visible light ID "light0021" of lighting device 21 and the camera number "CA0490" of surveillance camera 490 are associated.

When a plurality of surveillance cameras capture images of one light-receiving space, for example, a plurality of camera numbers may be associated with one visible light ID. At this time, the camera numbers may be assigned priorities.

1-2-3. Display

Display 485 displays images captured by surveillance cameras 490 to 494. Specifically, display 485 obtains, via communication unit 81, an image from the surveillance camera determined by controller 482, and displays the obtained image.

1-3. Cloud Server

Cloud server 500 includes image storage 501 and image editor 502 as illustrated in FIG. 14. Other functions of cloud server 500 are the same as those of cloud server 300 according to the first embodiment.

Image storage 501 is a storage device in which an image captured by each of surveillance cameras 490 to 494 is stored in association with the camera number. For example, image storage 501 is a HDD or a semiconductor memory such as a flash memory.

Figure 19:
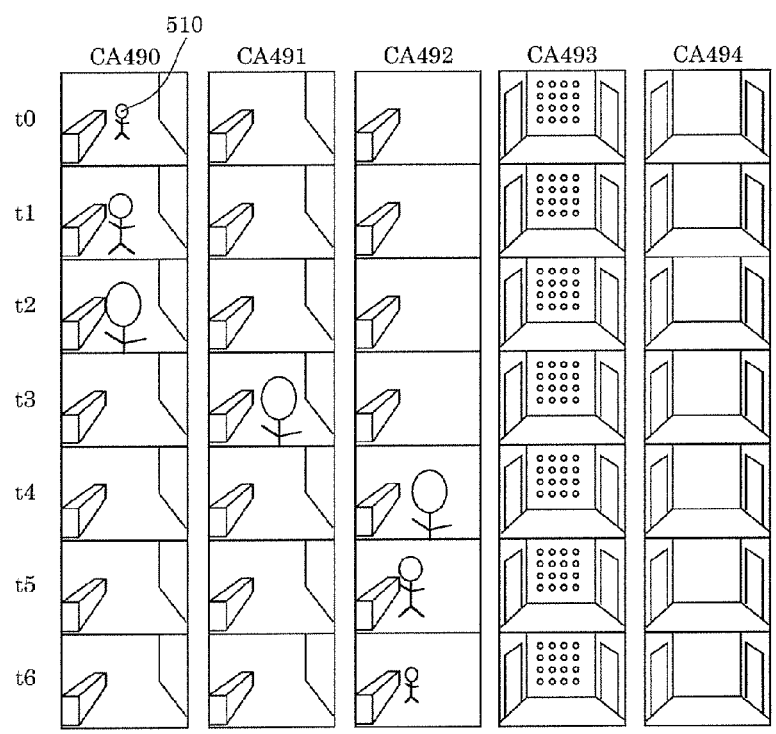
FIG. 19 illustrates images captured by cameras according to an embodiment of the present disclosure.

In the present embodiment, image storage 501 stores all images captured by surveillance cameras 490 to 494. FIG. 19 illustrates images captured by surveillance cameras 490 to 494 according to the present embodiment. Specifically, FIG. 19 illustrates, in sequence from the left column, images captured by surveillance cameras 490 to 494 between time point t0 and time point t6. The images in FIG. 19 show the movement of specific worker 510 illustrated in FIG. 16.

Note that image storage 501 does not need to store all images captured by surveillance cameras 490 to 494. For example, image storage 501 may store only an image displayed by display 485 of control device 480. Alternatively, image storage 501 may store only an image captured by a surveillance camera designated by a user.

Based on a temporal change in the light source identification information (the visible light ID) associated with the device identification information (the tag ID), image editor 502 generates tracking video that tracks the tag ID, from a plurality of images stored in image storage 501. Specifically, when a change occurs in the visible light ID, image editor 502 identifies a surveillance camera corresponding to the visible light ID after the change. Image editor 502 connects an image captured by the surveillance camera before the change and an image captured by the surveillance camera identified after the change. Every time a change occurs in the visible light ID, image editor 502 connects images, thereby generating tracking video such as that illustrated in FIG. 20.

Figure 20:
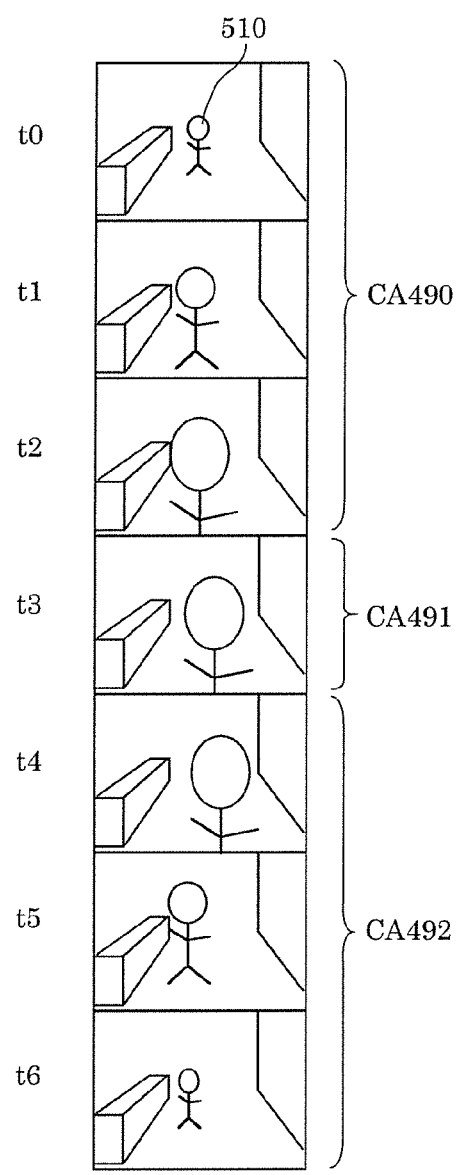
FIG. 20 illustrates tracking video of a specific worker according to an embodiment of the present disclosure.

FIG. 20 illustrates tracking video of specific worker 510 according to the present embodiment. Since images are connected according to movement of specific worker 510 with the use of a temporal change in the visible light ID, specific worker 510 can always be included in the tracking video as illustrated in FIG. 20.

For example, in line with the movement of specific worker 510 from the light-receiving space of lighting device 25 to the light-receiving space of lighting device 30, an image captured by surveillance camera 490 switches to an image captured by surveillance camera 491 between time point t2 and time point t3. Likewise, in line with the movement of specific worker 510 from the light-receiving space of lighting device 30 to the light-receiving space of lighting device 35, an image captured by surveillance camera 491 switches to an image captured by surveillance camera 492 between time point t3 and time point t4.

A detailed operation to generate tracking video will be described later with reference to FIG. 23.

Although the present embodiment has described the example where cloud server 500 includes image storage 501 and image editor 502, this is not the only example. Control device 480 may include at least one of image storage 501 and image editor 502.

2. Operation 2-1. Specific-ID Monitoring Mode

Figure 21:
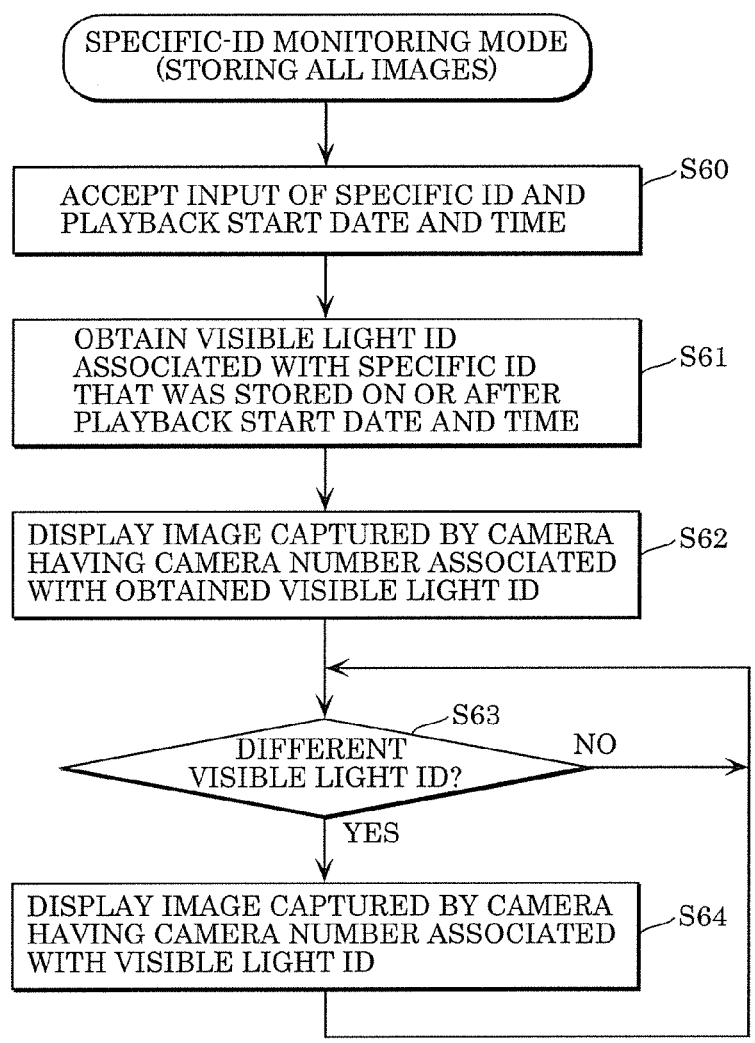
FIG. 21 is a flowchart illustrating a method of managing a specific worker according to an embodiment of the present disclosure.

FIG. 21 is a flowchart illustrating a method of managing specific worker 510 according to the present embodiment. The following describes a case where all images captured by a plurality of surveillance cameras 490 to 494 are stored in image storage 501 of cloud server 500 as described above.

First, controller 482 accepts input of a specific ID and a playback start date and time by way of input unit 84 (S60).

The specific ID is the tag ID of specific worker 510. In other words, the specific ID is a tag ID of a worker intended by a user (a supervisor) to be monitored. Input unit 84 may directly accept the specific ID or may accept personal information such as the name of specific worker 510. Controller 482 may obtain the specific ID based on the accepted personal information, with reference to the biometric authentication database or the worker database.

The playback start date and time is any point in time. For example, the playback start date and time may be a point in time when specific worker 510 starts working Next, controller 482 obtains the visible light ID associated with the specific ID and stored on or after the playback start date and time (S61). Specifically, controller 482 obtains the visible light ID associated with the specific ID, with reference to the worker log information (FIG. 7A). For example, controller 482 extracts from the worker log information the time information and the visible light ID associated with the specific ID.

Next, controller 482 displays an image captured by a camera having the camera number associated with the obtained visible light ID (S62). Specifically, controller 482 obtains the camera number associated with the obtained visible light ID, with reference to association table 483a. Controller 482 reads from image storage 501 an image captured by a camera having the obtained camera number, and causes display 485 to display the image.

Next, controller 482 determines whether or not a different visible light ID has been obtained (S63). Specifically, in synchronization of images being displayed (played back), controller 482 obtains visible light IDs associated with the specific ID in time sequence, with reference to the worker log information. When the currently obtained visible light ID is the same as the immediately previously obtained visible light ID (No in S63), controller 482 obtains the next visible light ID and repeats the determination.

When the currently obtained visible light ID is different from the immediately previously obtained visible light ID (Yes in S63), controller 482 displays an image captured by a camera having the camera number associated with the currently obtained visible light ID (S64). In short, the image being displayed switches to another image. Subsequently, the processing returns to Step S63, and controller 482 repeats the determination on the visible light ID and the switching of images being displayed.

In the way described above, tracking video such as that illustrated in FIG. 20, for example, is displayed on display 485.

2-2. Real-Time Monitoring Mode

Figure 22:
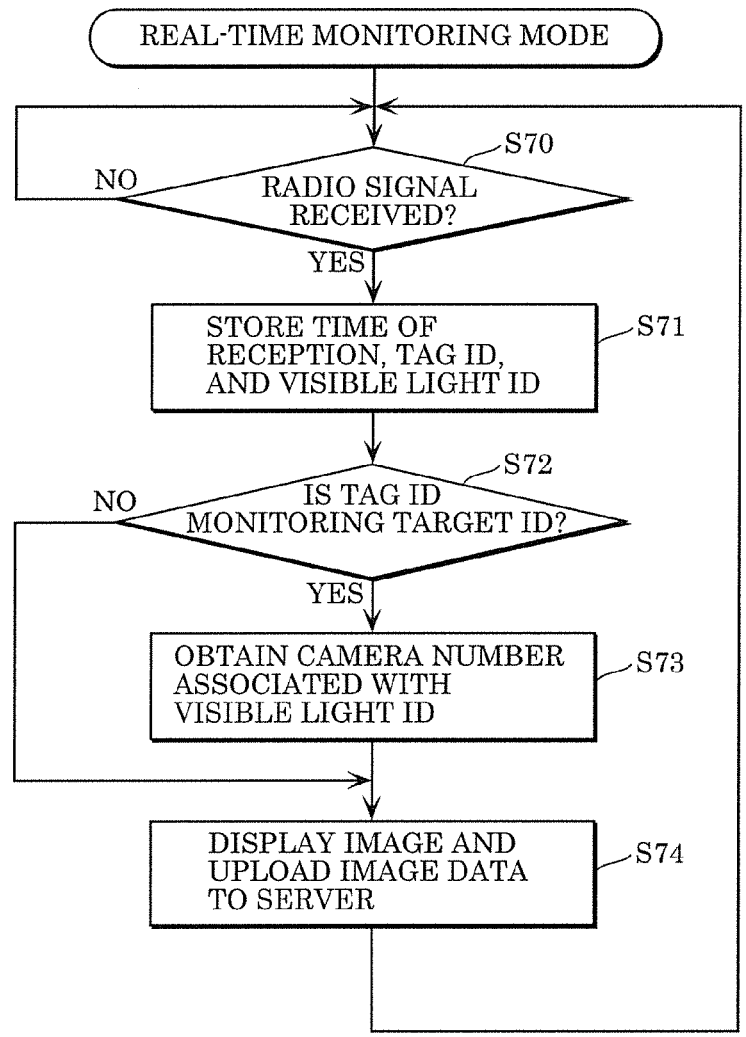
FIG. 22 is a flowchart illustrating another example of a method of managing a specific worker according to an embodiment of the present disclosure.

FIG. 22 is a flowchart illustrating a method of managing specific worker 510 according to the present embodiment. Specifically, FIG. 22 shows a case where specific worker 510 is monitored real-time.

The following describes a case where specific worker 510 is designated in advance. This means that the tag ID of specific worker 510 to be monitored is preset.

First, control device 480 waits for communication unit 81 to receive a radio signal from worker management device 200 (No in S70). When a radio signal is received (Yes in S70), controller 482 stores into storage 483 the tag ID and the visible light ID included in the received radio signal, in association with the time information (S71).

Controller 482 determines whether or not the obtained tag ID is a monitoring target ID (that is, the specific ID) (S72). The monitoring target ID is the tag ID of specific worker 510.

When the tag ID is the monitoring target ID (Yes in S72), controller 482 obtains the camera number associated with the visible light ID (S73). Next, controller 482 causes display 485 to display an image captured by a surveillance camera corresponding to the obtained camera number (S74). Furthermore, controller 482 uploads image data from the surveillance camera to cloud server 500.

When the tag ID is not the monitoring target ID (No in S72), controller 482 does not obtain the camera number, and the image being displayed is displayed on display 485 (S74). Furthermore, controller 482 uploads to cloud server 500 data of the image being displayed.

The following specifically describes a method of managing specific worker 510 illustrated in FIG. 22, assuming as an example that specific worker 510 moves along the bold dashed-line arrow in FIG. 16.

Since there are usually a plurality of workers inside a factory, the tag ID and the visible light ID are transmitted to control device 480 every time worker management device 200 of each worker obtains the visible light ID. Until the tag ID that matches the monitoring target ID is received, display 485 displays an image that is being displayed (No in S72, and S74). Alternatively, display 485 does not need to display images.

In the example illustrated in FIG. 16, specific worker 510 is present in the light-receiving space of lighting device 23 at time point to. Therefore, controller 482 receives, together with the visible light ID "light0023," the tag ID that matches the monitoring target ID (Yes in S72). With this, controller 482 obtains the camera number "CA0490" with reference to association table 483a illustrated in FIG. 18 (S73). Thus, an image captured by surveillance camera 490 is displayed on display 485 (S74).

Specific worker 510 is present in the light-receiving space of lighting device 24 at time point t1. In this case, the visible light ID "light0024" is received. Since the camera number associated with the visible light ID "light0024" is "CA0490," an image captured by surveillance camera 490 is displayed on display 485. The same applies at time point t2.

Specific worker 510 is present in the light-receiving space of lighting device 30 at time point t3. In this case, the visible light ID "light0030" is received. Since the camera number associated with the visible light ID "light0030" is "CA0491," an image captured by surveillance camera 491 is displayed on display 485. The subsequent process is performed in the same manner. The image being displayed on display 485 switches at time point t4 from an image captured by surveillance camera 491 to an image captured by surveillance camera 492.

In the way described above, tracking video such as that illustrated in FIG. 20 is displayed on display 485.

2-3. Editing Mode

Figure 23:
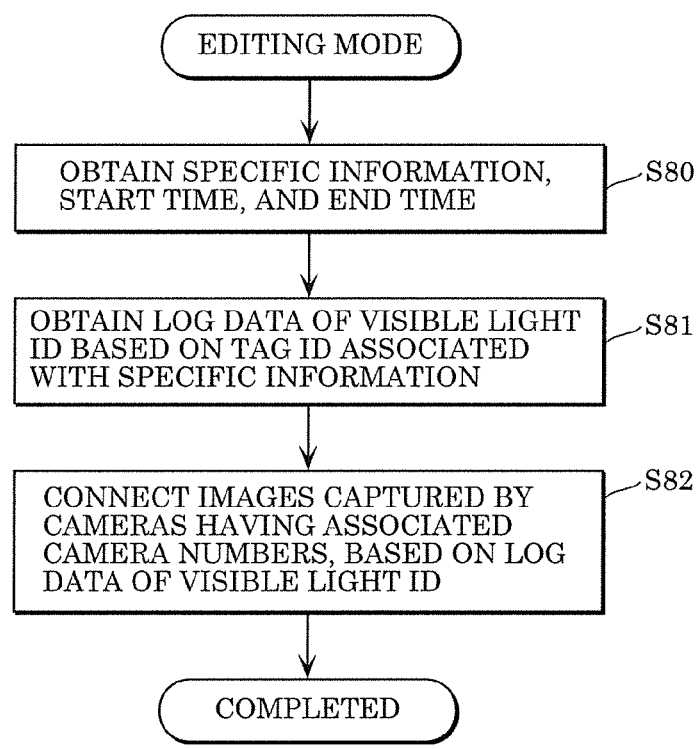
FIG. 23 is a flowchart illustrating a method of generating tracking video of a specific worker according to an embodiment of the present disclosure.

FIG. 23 is a flowchart illustrating a method of generating tracking video of specific worker 501 according to the present embodiment. Specifically, FIG. 23 shows how to generate tracking video by editing images captured and recorded by a plurality of surveillance cameras 490 to 494.

First, image editing unit 502 obtains specific information for specifying specific worker 510, and start time and end time of an editing process (S80). The specific information is, for example, personal information such as the name of specific worker 510. Image editor 502 obtains the specific ID from the accepted specific information with reference to the biometric authentication database or the worker database. Note that image editor 502 may directly accept the specific ID.

Next, image editor 502 obtains, based on the specific ID, log data indicating a temporal change in the visible light ID (S81). Specifically, image editor 502 obtains log information on specific worker 510, such as that illustrated in FIG. 17, with reference to the worker log information illustrated in FIG. 7A.

Next, based on the obtained log data indicating a temporal change in the visible light ID, image editor 502 connects images captured by cameras having corresponding camera numbers (S82). Specifically, image editor 502 obtains the camera number associated with each visible light ID, with reference to association table 483a. In the case where a change occurs in the camera numbers that are sequentially obtained, image editor 502 connects an image captured by the camera having a camera number before the change and an image captured by the camera having a camera number after the change. By doing so, for example, it is possible to generate tracking video such as that illustrated in FIG. 20.

3. Effects and Others

As described above, worker management system 400 according to the present embodiment includes: a plurality of lighting devices 21 to 37; and a plurality of surveillance cameras 490 to 494 each of which captures an image of a light-receiving space where the light from at least one of lighting devices 21 to 37 is receivable, and storage 483 further stores association table 483a associating lighting devices 21 to 37 and surveillance cameras 490 to 494.

Thus, since the plurality of surveillance cameras 490 to 494 are provided, it is possible to monitor not only worker's route of movement and location but also worker's actions. Furthermore, since association table 483a associating lighting devices 21 to 37 and surveillance cameras 490 to 494 is stored, it is possible to check an image captured by the surveillance camera associated with the visible light ID, with reference to association table 483a.

For example, controller 482 further identifies, with reference to association table 483a, a surveillance camera that captures an image of the light-receiving space of the lighting device corresponding to the light source identification information associated with the device identification information, and outputs, to display 485, the image captured by the identified surveillance camera.

With this, for example, when a predetermined tag ID is designated, an image captured by the surveillance camera corresponding to the visible light ID associated with such tag ID is displayed on display 485. Thus, only by designating a tag ID, it is possible to check, on video, the worker corresponding to such tag ID.

For example, when a change occurs in the light source identification information associated with the device identification information, controller 482 identifies the surveillance camera corresponding to the light source identification information after the change, and outputs, to display 485, an image captured by the identified surveillance camera.

With this, since a camera is identified every time a change occurs in the visible light ID, tracking video of specific worker 510 can be displayed real-time on display 485. Therefore, it is possible to check actions of specific worker 510, for example, real-time on video.

For example, worker management system 400 further includes: image storage 501 in which an image captured by each of a plurality of surveillance cameras 490 to 494 is stored in association with a camera number unique to the surveillance camera; and image editor 502 that generates tracking video from a plurality of images stored in image storage 501, based on a temporal change in the light source identification information associated with the device identification information, the tracking video tracking the device identification information.

With this, it is possible to generate tracking video of specific worker 510 from a plurality of stored images. Therefore, for example, not only a route of movement and location but also actions of specific worker 510 can be monitored afterwards rather than real-time.

Third Embodiment

The following describes a worker management system according to a third embodiment, and a worker management device and workwear that are used in the worker management system. Note that the following description will focus on differences from the first embodiment, and the same constituents as those in the first embodiment are denoted by the same numerals and symbols so that description thereof is omitted or simplified.

1. Worker Management Device

Figure 24:
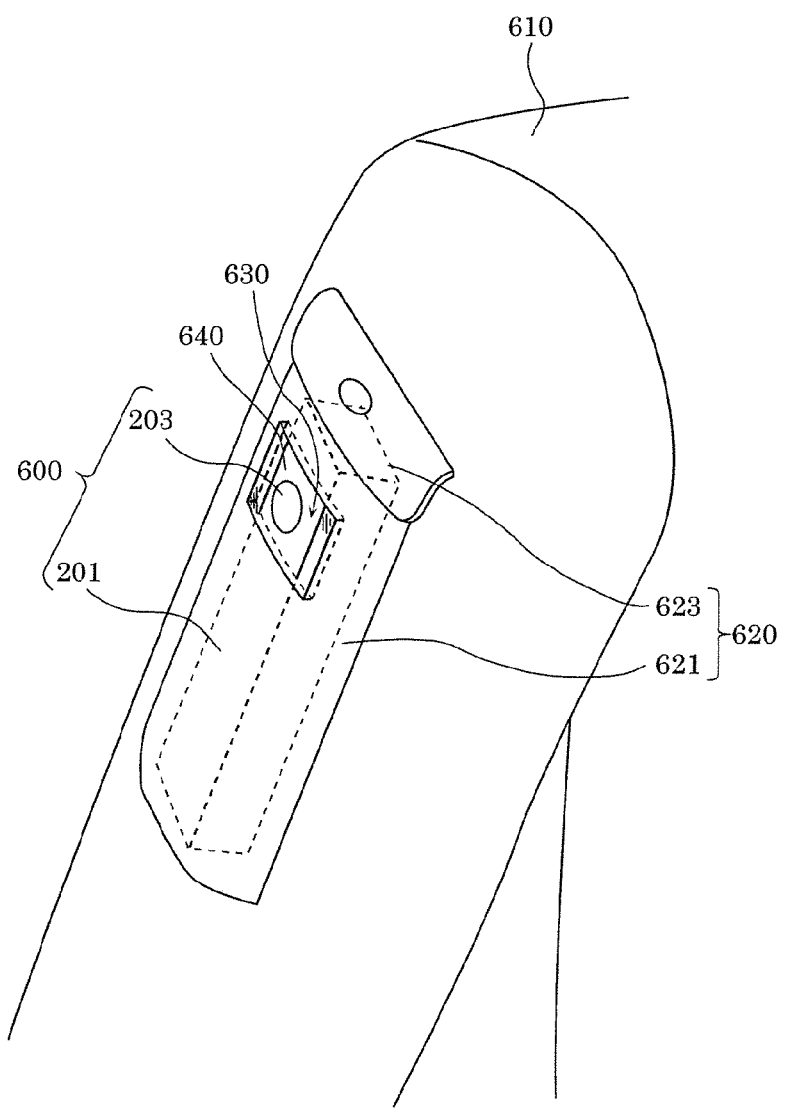
FIG. 24 is a perspective view illustrating an example in which a worker management device is attached to workwear according to an embodiment of the present disclosure.
Figure 25:
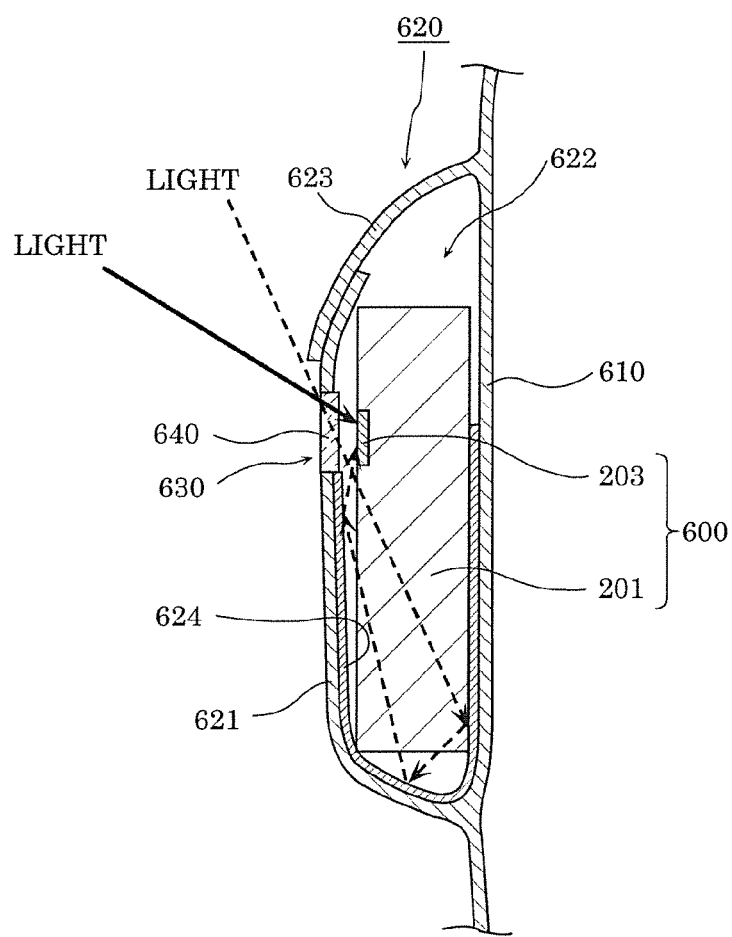
FIG. 25 is a cross-sectional view illustrating an example in which a worker management device is attached to workwear according to an embodiment of the present disclosure.

FIG. 24 and FIG. 25 are a perspective view and a cross-sectional view, respectively, illustrating an example in which worker management device 600 is attached to workwear 610 according to the present embodiment. Specifically, FIG. 24 illustrates a shoulder and an upper arm portion of worker wearing workwear 610. FIG. 25 illustrates a cross-section of worker management device 600 inserted into pocket 620 of workwear 610. In FIG. 25, the bold line arrow indicates a path of illuminating light.

Worker management device 600 is different from worker management device 200a according to the first embodiment in that attachment element 202 is not included. Specifically, worker management device 600 includes main body 201 and light receiver 203. Worker management device 600 is attached to workwear 610 by being received in pocket 620 as illustrated in FIG. 24.

2. Workwear

As compared to workwear 110 according to the first embodiment, workwear 610 includes pocket 620 instead of companion attachment element 113. In the present embodiment, workwear 610 includes pocket 620, light-transmitting window 630, and cover 640 as illustrated in FIG. 24.

Pocket 620 is for attaching worker management device 600 to workwear 610. Light-transmitting window 630 is provided at a front face of pocket 620. The front face of pocket 620 is a surface thereof exposed when a worker wears workwear 610. Pocket 620 is made of the same material (for example, a fibrous material) as workwear 610, for example. A detailed structure of pocket 620 will be described later.

Light-transmitting window 630 is an opening for passage of illuminating light (visible light). Light-transmitting window 630 is provided in a position that overlaps light receiver 203 when pocket 620 is viewed from front when worker management device 600 is inserted into pocket 620. This means that light-transmitting window 630 is provided in such a position that light receiver 203 can be viewed through light-transmitting window 630.

Cover 640 is a light-transmitting cover provided on light-transmitting window 630. When cover 640 is provided on light-transmitting window 630, the occurrences of foreign objects, dust, or the like entering pocket 620 can be reduced while illuminating light is allowed to enter pocket 620. Cover 640 is, for example, made of a light-transmitting resin material.

3. Pocket

As illustrated in FIG. 25, pocket 620 includes: housing 621 that receives worker management device 600; lid 623 that covers opening 622 in such a way as to be able to uncover opening 622; and light reflector 624. When lid 623 is open, worker management device 600 can be inserted into housing 621 through opening 622. With lid 623 closed after worker management device 600 is inserted, it is possible to reduce the occurrences of dust or the like from entering housing 621.

Light reflector 624 is a light-reflective member provided on an inner side of housing 621, that is, inside pocket 620. Light reflector 624 is, for example, a flexible metal film. Light reflector 624 is provided in a position that is at a level lower than light receiver 203 when worker management device 600 is received in pocket 620. Here, the wording "lower" means, for example, vertically lower as viewed when worker wearing workwear 610 stands upright.

Since light reflector 624 is provided on an inner side of pocket 620, light that has been transmitted by light-transmitting window 630 and has not entered light receiver 203 can be reflected inside pocket 620.

Thus, light which light receiver 203 has failed to directly receive can enter light receiver 203 by being reflected off light reflector 624 as indicated by the bold dashed-line arrow in FIG. 25. This means that the rate of light being received by light receiver 203 can be increased.

Note that housing 621 and light reflector 624 may be integrally formed. For example, housing 621 may be formed from a light-reflective metal film. In detail, an inner surface portion of pocket 620 that is at a level lower than light receiver 203 when worker management device 600 is received in pocket 620 may be light reflective.

4. Effects and Others

As described above, workwear 610 according to the present embodiment is workwear to which worker management device 600 is attached and which includes: pocket 620 that receives worker management device 600; light-transmitting window 630 provided at a front face of pocket 620; and light-transmitting cover 640 provided on light-transmitting window 630.

With this, even when attachment element 202 is not provided on worker management device 600, such worker management device 600 can be received in pocket 620. This means that workwear 610 according to the present embodiment enables the use of worker management devices of various types. In other words, workwear 610 is highly versatile.

For example, a part of an inner face of pocket 620 that is at a level lower than light receiver 203 when worker management device 600 is received in pocket 620 is light reflective.

With this, illuminating light can be reflected inside the pocket, and therefore, the rate of light being received by light receiver 203 can be increased.

5. Variation

The following describes a variation of the third embodiment.

Figure 26:
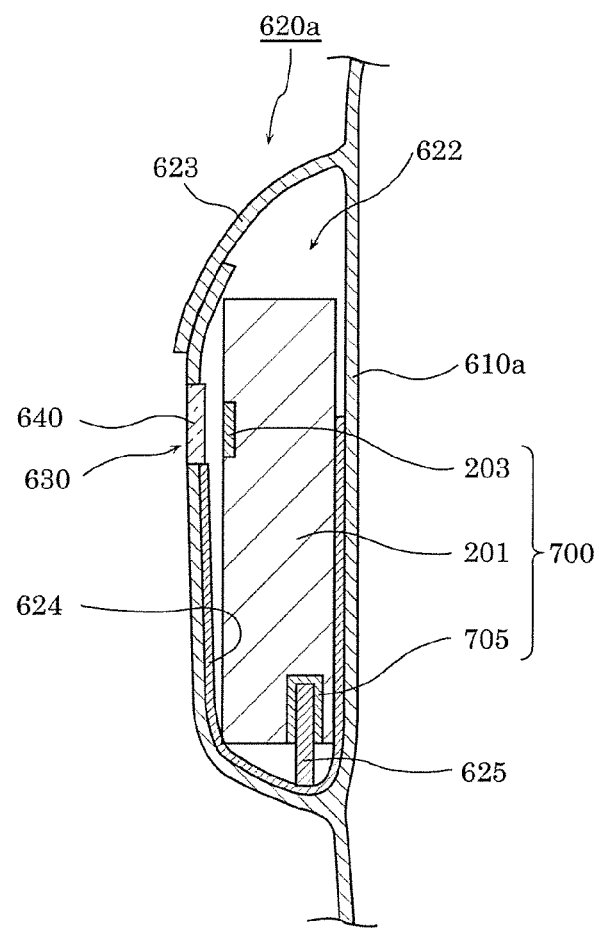
FIG. 26 is a cross-sectional view illustrating an example in which a worker management device is attached to workwear according to a variation of an embodiment of the present disclosure.

FIG. 26 is a cross-sectional view illustrating an example in which worker management device 700 is attached to workwear 610*a* according to the present variation.

Worker management device 700 is different from worker management device 600 in that pin receiver 705 is further provided. Pin receiver 705 is an example of a detector that detects whether or not main body 201 of worker management device 700 is attached to workwear 610*a*. Pin receiver 705 is, for example, a receptacle (socket). Pin 625 of workwear 610*a* is inserted into pin receiver 705.

Workwear 610*a* includes pin 625. Pin 625 is provided inside pocket 620*a*. Pin 625 is, for example, a metallic pin. Pin receiver 705 is an example of a companion detector that detects whether or not main body 201 of worker management device 700 is attached to workwear 610*a*.

Figure 27:
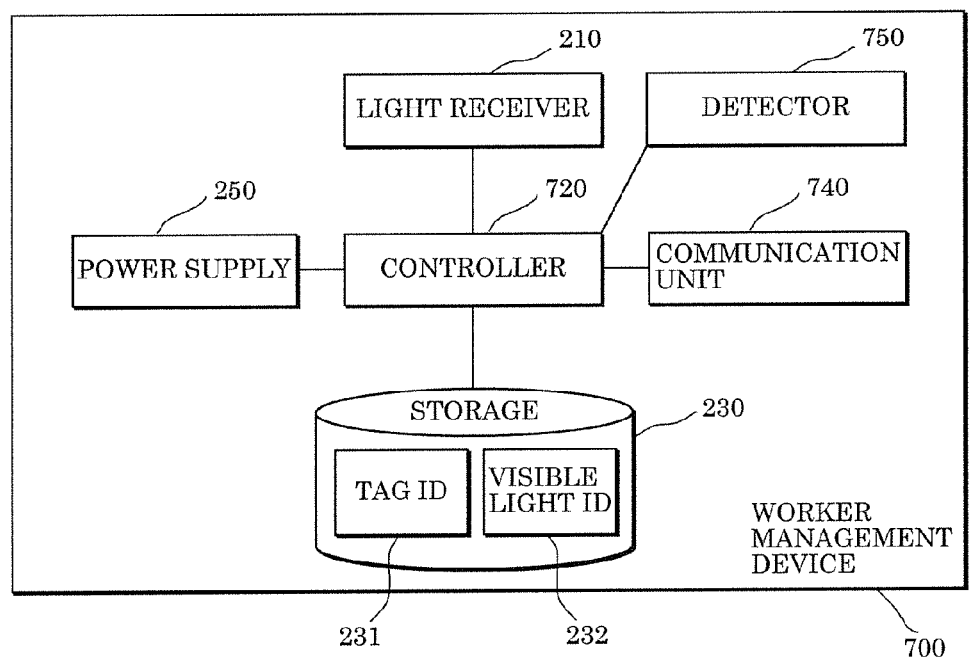
FIG. 27 is a block diagram illustrating a structure of a worker management device according to a variation of an embodiment of the present disclosure.

FIG. 27 is a block diagram illustrating a structure of worker management device 700 according to the present variation. As illustrated in FIG. 27, worker management device 700 includes controller 720 and communication unit 740 instead of controller 220 and communication unit 240 as compared to worker management device 200 according to the first embodiment. Furthermore, worker management device 700 additionally includes detector 750.

In addition to performing the above-described operation, controller 720 generates a device-unattached signal when detector 750 detects that main body 201 is not attached to workwear 610*a*. The device-unattached signal is a signal indicating that main body 201 is not attached to workwear 610*a*.

Communication unit 740 transmits the device-unattached signal generated by controller 720. For example, communication unit 740 transmits the device-unattached signal to controller 80. This makes it possible, for example, to inform controller 80 that there is a worker who is not properly wearing worker management device 700.

Detector 750 detects whether or not main body 201 is attached to workwear 610*a*. Detector 750 is equivalent to pin receiver 705 illustrated in FIG. 26. For example, when pin 625 is inserted into pin receiver 705, detector 750 determines that main body 201 is attached to workwear 610*a*. When pin 625 is not inserted into pin receiver 705, detector 750 determines that main body 201 is not attached to workwear 610*a*.

Note that worker management device 700 may include a sound unit that outputs an alarm sound or the like. For example, when the sound unit receives the device-unattached signal, the sound unit may output the alarm sound. With this, the worker can be urged to properly wear worker management device 700.

As described above, worker management device 700 according to the present variation further includes detector 750 that is connected to controller 720 and detects whether or not main body 201 is attached to workwear 610*a*.

With this, it is possible to determine whether or not worker management device 700 is properly attached to workwear 610*a*.

For example, controller 720 further generates a device-unattached signal indicating that main body 201 is not attached to workwear 610*a*, when detector 750 detects that main body 201 is not attached to workwear 610*a*, and communication unit 740 transmits the device-unattached signal generated by controller 720.

With this, for example, it is possible to inform the worker himself or herself, a manager, or the like of an abnormal situation such as when worker management device 700 is removed with a malicious intent or when worker management device 700 is removed due to some factors.

For example, workwear 610*a* according to the present variation is workwear to which worker management device 700 is attached and which includes: pocket 620*a* that receives worker management device 700; light-transmitting window 630 provided at a front face of pocket 620*a*; light-transmitting cover 640 provided on light-transmitting window 630; and pin 625 that causes detector 750 to detect that main body 201 is attached to workwear 610*a*.

With this, it is possible to determine whether or not worker management device 700 is properly attached to workwear 610*a*.

Others

Although the worker management device, worker management system, and workwear according to the present disclosure are described based on the above embodiments and variations thereof, the present disclosure is not limited to the above embodiments.

For example, although worker management system 1 according to the above embodiments manages entering, in-room actions, and exiting of worker 100, at least one of these may be managed. In other words, it is not necessary that all of the entering process, the in-room process, and the exiting process be performed.

Furthermore, although the above embodiments describe the example in which attachment element 202 is a hook-and-loop fastener, this is not the only example. For example, attachment element 202 may be safety pins, clips, chains, or ropes. For example, when attachment element 202 is a safety pin, companion attachment element 113 does not need to be provided on workwear 110.

Furthermore, although lighting devices 21 to 37 that output visible light are described as one example of a light source of worker management system 1 according to the above embodiments, this is not only the example. For example, an infrared output device that outputs infrared light may be used instead of lighting devices 21 to 37.

Furthermore, although the configuration of worker management system 1 according to the above embodiments that uploads data to cloud server 300 is described, this is not the only example. In worker management system 1, cloud server 300 does not need to be included, and various data may be accumulated in storage 83 of control device 80.

Furthermore, although wireless relays 51 to 54 relay communication between worker management device 200 and control device 80 in worker management system 1 according to the above embodiments, this is not the only example. For example, worker management device 200 may directly communicate with control device 80.

Moreover, worker management system 1 according to the above embodiments is available in not only factories but also, for example, hospitals, schools, railway stations, or sports facilities. This means that worker management system 1 is usable in the case where more than one person wears clothing similar to that of another in a certain space. Specifically, worker 100 includes employees such as doctors, nurses, and a station staff, students, customers, or athletes, and workwear 110 includes white lab coats and uniforms. With this, it is possible to monitor suspicious individuals, for example, enhancing the security of such facilities.

Furthermore, for example, the third embodiment describes the example in which pocket 620 is provided on an upper arm portion of workwear 610, but this is not the only example. It is sufficient that pocket 620 is provided on a portion that can receive illuminating light when the worker is working or moving. Pocket 620 may be provided on a head (a cap), shoulder, or back portion, for example.

Note that these general and specific aspects in the above embodiments may be implemented using a system, a method, an integrated circuit, a computer program, or a computer-readable recording medium such as CD-ROM, or any combination of systems, methods, integrated circuits, computer programs, and recording media.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A worker management device that manages a worker wearing workwear, the worker management device comprising:
   a main body;
   a light receiver that is provided on a part of the main body and receives light including identification information which is predetermined, the part of the main body being exposed when the main body is attached to the workwear;
   a controller connected to the light receiver; and
   a communication interface connected to the controller,
   wherein the identification information is light source identification information indicating an ID unique to a light source that outputs the light,
   the controller extracts the light source identification information from the light received by the light receiver, and
   the communication interface is configured to transmit the light source identification information extracted by the controller.

2. The worker management device according to claim 1, further comprising
   an attachment element that is provided on a part of the main body and attaches the main body to the workwear,
   wherein the light receiver is provided on the part that is exposed when the main body is attached to the workwear by the attachment element.

3. The worker management device according to claim 2, wherein the attachment element is provided on a bottom portion of the main body, and
   the light receiver is provided on a top portion or a side portion of the main body.

4. The worker management device according to claim 1, further comprising
   a storage that stores device identification information indicating a device ID unique to the worker management device,
   wherein the communication interface is configured to transmit the light source identification information and the device identification information in association.

5. The worker management device according to claim 1, wherein the light is either one of visible light and infrared light.

6. The worker management device according to claim 1, further comprising
   a detector that is connected to the controller and detects whether or not the main body is attached to the workwear.

7. The worker management device according to claim 6, wherein the controller further generates a device-unattached signal indicating that the main body is not attached to the workwear, when the detector detects that the main body is not attached to the workwear, and
   the communication interface is configured to transmit the device-unattached signal generated by the controller.

8. A worker management system comprising:
   a worker management device that manages a worker wearing workwear, the worker management device comprising:
   a main body;
   a light receiver that is provided on a part of the main body and receives light including identification information which is predetermined, the part of the main body being exposed when the main body is attached to the workwear;
   a first controller connected to the light receiver; and a first communication interface connected to the first controller;
a light source that outputs the light including the identification information; and
a control device that communicates with the worker management device,
wherein the control device includes:
a second communication interface configured to communicate with the first communication interface; and
a second controller connected to the second communication unit interface.

9. The worker management system according to claim 8,
wherein the identification information is light source identification information indicating an ID unique to the light source,
the second communication interface is configured to receive from the first communication interface the light source identification information and device identification information indicating a device ID unique to the worker management device, and
the second controller stores into a storage the light source identification information and the device identification information received by the second communication interface, in association with time information.

10. The worker management system according to claim 9,
wherein the second controller controls, based on the light source identification information and the device identification information, unlocking and locking of a door provided in a room where the light source is installed.

11. The worker management system according to claim 9, further comprising
a plurality of the light sources; and
a plurality of cameras each of which captures an image of a light-receiving space where the light from at least one of the light sources is receivable,
wherein the storage further stores a table associating the light sources and the cameras.

12. The worker management system according to claim 11,
wherein the second controller further (i) identifies, with reference to the table, a camera of the cameras that captures an image of the light-receiving space of the light source corresponding to the light source identification information associated with the device identification information, and (ii) outputs, to a monitor, the image captured by the camera identified.

13. The worker management system according to claim 12,
wherein when a change occurs in the light source identification information associated with the device identification information, the second controller (i) identifies a camera of the cameras that corresponds to the light source identification information after the change, and (ii) outputs, to the monitor, an image captured by the camera identified.

14. The worker management system according to claim 11, further comprising:
an image storage in which an image captured by each of the cameras is stored in association with a camera number unique to the camera; and
an image editor that generates tracking video from a plurality of images stored in the image storage, based on a temporal change in the light source identification information associated with the device identification information, the tracking video tracking the device identification information.

15. The worker management system according to claim 9, further comprising
a cloud server including the storage.

16. The worker management system according to claim 8,
wherein the light source is either one of a lighting device that outputs visible light as the light and an infrared output device that outputs infrared light as the light.

17. The worker management system according to claim 8, further comprising
a wireless relay that relays communication between the first communication interface and the second communication interface.

18. Workwear to which a worker management device is attached, the workwear comprising:
a pocket that receives the worker management device;
a light-transmitting window provided at a front face of the pocket; and
a light-transmitting cover provided on the light-transmitting window,
wherein the worker management device manages a worker wearing workwear, the worker management device comprising:
a main body;
a light receiver that is provided on a part of the main body and receives light including identification information which is predetermined, the part of the main body being exposed when the main body is attached to the workwear;
a controller connected to the light receiver; and
a communication interface connected to the controller.

19. The workwear to which a worker management device is attached, the workwear comprising:
a pocket that receives the worker management device;
a light-transmitting window provided at a front face of the pocket;
a light-transmitting cover provided on the light-transmitting window; and
a companion detector that causes the detector to detect that the main body is attached to the workwear;
wherein the worker management device manages a worker wearing workwear, the worker management device comprising:
a main body;
a light receiver that is provided on a part of the main body and receives light including identification information which is predetermined, the part of the main body being exposed when the main body is attached to the workwear;
a controller connected to the light receiver;
a communication interface connected to the controller; and
a detector that is connected to the controller and detects whether or not the main body is attached to the workwear.

20. The workwear according to claim 18,
wherein a part of an inner face of the pocket is light reflective, the part of the inner face being at a level lower than the light receiver when the worker management device is received in the pocket.

* * * * *